(12) United States Patent
Kim et al.

(10) Patent No.: US 9,269,931 B2
(45) Date of Patent: Feb. 23, 2016

(54) BATTERY COVER FOR PREVENTION OF ELECTROLYTE LEAKAGE

(71) Applicant: Global Battery Co., Ltd, Seoul (KR)

(72) Inventors: Hyun Ryung Kim, Gwangju (KR); Seung Bok Park, Gwangju (KR); Kyu Hyeong Lee, Gwangju (KR)

(73) Assignee: GLOBAL BATTERY CO., LTD., Seoul (KR)

( * ) Notice: Subject to any disclaimer, the term of this patent is extended or adjusted under 35 U.S.C. 154(b) by 10 days.

(21) Appl. No.: 13/762,678

(22) Filed: Feb. 8, 2013

(65) Prior Publication Data

US 2014/0147733 A1    May 29, 2014

(30) Foreign Application Priority Data

Nov. 29, 2012  (KR) .......................... 10-2012-0136977

(51) Int. Cl.
*H01M 2/04* (2006.01)
*H01M 2/36* (2006.01)

(52) U.S. Cl.
CPC ............ *H01M 2/0456* (2013.01); *H01M 2/043* (2013.01); *H01M 2/367* (2013.01)

(58) Field of Classification Search
CPC .... H01M 2/043; H01M 2/0456; H01M 2/367
USPC .......................................................... 429/175
See application file for complete search history.

(56) References Cited

U.S. PATENT DOCUMENTS

RE37,901 E * 11/2002 Fritts et al. ....................... 429/84
2003/0017381 A1* 1/2003 Mittal et al. ..................... 429/89
2009/0325040 A1* 12/2009 Saito et al. ....................... 429/53

FOREIGN PATENT DOCUMENTS

KR       2002-0043008 A    6/2002
KR  10-2009-0124110 A   12/2009

* cited by examiner

*Primary Examiner* — Jonathan Jelsma
(74) *Attorney, Agent, or Firm* — The PL Law Group, PLLC

(57) ABSTRACT

In a battery cover, a sealed assembly structure of upper and lower covers of a battery case is configured in such a way that it forms a labyrinth structure that can allow an electrolyte to move upward and downward, thereby increasing an electrolyte leakage resistance of the battery case. Gas discharge holes and micro-holes are formed in the battery cover, and so the battery cover can easily discharge gas from the battery case. In the battery cover, electrolyte recovery ports are arrayed in such a way that the electrolyte can be prevented from leaking from the battery case even when the battery case is turned over or tilts to one side.

10 Claims, 14 Drawing Sheets

PRIOR ART

BATTERY COVER FOR PREVENTION OF ELECTROLYTE LEAKAGE

CROSS REFERENCE TO RELATED APPLICATIONS AND CLAIM OF PRIORITY

This patent application claims priority to Korean Patent Application number 10-2012-0136977, filed Nov. 29, 2012, entire contents of which are incorporated herein by reference.

BACKGROUND

1. Field of the Invention

The present invention relates, in general, to battery covers for prevention of electrolyte leakage and, more particularly, to a battery cover for prevention of electrolyte leakage, in which a sealed assembly structure of upper and lower covers of a battery case is configured in such a way that it forms a labyrinth structure that can allow an electrolyte to move upward and downward, thereby increasing an electrolyte leakage resistance of the battery case, and in which gas discharge holes and micro-holes are formed so as to easily discharge gas from the battery case, and in which electrolyte recovery ports are arrayed in such a way that the electrolyte can be prevented from leaking from the battery case even when the battery case is turned over or is tilted to one side.

2. Description of the Related Art

A battery is a device that can supply electricity by discharging charged electricity. A rechargeable battery that can be recycled by repeating electricity charge and discharge processes a predetermined number of times is so called as a secondary battery or as a storage battery (hereinbelow, referred to simply as a battery).

Batteries are classified into a variety of types according to materials of positive and negative plates and a material of an electrolyte, in which a battery using lead as the material of the positive and negative plates and using a sulfuric acid as the electrolyte is named a lead-acid battery.

The lead-acid battery includes polar plates used as positive and negative plates, terminals, a separator that physically and electrically separates the two polar plates from each other, an electrolyte and a battery case that receives the elements therein. Further, a gas discharge port is typically formed in the sealed battery case so as to discharge hydrogen gas generated from the charge and discharge processes and to discharge gas generated from evaporation of the electrolyte.

An example of the lead-acid batteries is a battery that is operated by repeating the discharge and charge processes through a reversible reaction represented by a chemical reaction formula: $PbO_2+H_2SO_4 \leftrightarrow PbSO_4+2H_2O$. The battery outputs electricity through discharging and stores input electricity therein through charging.

The lead-acid battery uses a chemical reaction in which the polar plates of lead dioxide ($PbO_2$) and an electrolyte of sulfuric acid ($H_2SO_4$) are changed into lead sulfate ($PbSO_4$) and water ($H_2O$). When the lead dioxide and the sulfuric acid are changed into lead sulfate ($PbSO_4$) and water ($H_2O$) in the lead-acid battery, electricity is generated and discharged. On the contrary, when the lead-acid battery is charged, substitution is performed.

Every time the above-mentioned chemical reaction is performed, heat is generated in the battery and causes the electrolyte to partially vaporize and a small quantity of hydrogen gas to be generated, so it is required to discharge the gas from the battery into the atmosphere so as to prevent the battery from exploding.

Further, a vehicle battery is directly affected by the jolting vibration of a vehicle during a movement of the vehicle, so it is required that an electrolyte be prevented from leaking from the battery to the outside through the gas discharge port.

Examples of conventional techniques that were proposed to discharge gas from the interior of the battery to the outside may be referred to in Korean Patent Application No. 10-2000-0072402 (filed on Dec. 1, 2000) entitled "STRUCTURE FOR DISCHARGING EVAPORATING GAS FROM VEHICLE BATTERY" and to Korean Patent Application No. 10-2008-0050115 (field on May 29, 2008) entitled "VENT PLUG FOR Ni-MH BATTERY".

FIG. 1 is a view illustrating the functional construction of the vent plug that is a prior art device proposed to prevent a leakage of a battery electrolyte and to discharge gas from the battery.

Hereinbelow, the above-mentioned device will be described in detail with reference to the accompanying drawing, FIG. 1. As shown in the drawing, gas generated in the battery is discharged to the outside through a battery cover 110 that is integrally formed in an upper end of a battery case 200.

Here, the battery cover 110 has a cylindrical structure having predetermined diameter and height. The battery case 200 forms cells and receives positive plates 210, negative plates 220, separators 230 and an electrolyte 240 therein.

The battery cover 110 is provided with electrolyte injection ports that communicate with respective chambers which are defined as divided spaces in the battery case 200 by a plurality of partition walls. A valve 130 is inserted into each electrolyte injection port, with a packing 150 placed around the upper end of the electrolyte injection port so as to seal a gap between the electrolyte injection port and the valve 130.

Further, the cylindrical battery cover 110 has threads in an inner circumferential surface thereof, and a plug that includes a vent cap 120 having threads around an outer circumferential surface thereof is tightened to the cylindrical battery cover 110, with a spring 140 placed in the vent cap, so that the plug can seal the electrolyte injection port.

A gas discharge hole is formed through the upper end of the vent cap 120 so that gas can be discharged to the outside through the gas discharge hole.

The above-mentioned conventional technique provides a structure that can discharge gas from the battery to the outside according to elasticity of the spring 140 and is advantageous in that, when gas is generated in the battery to an extent at which the gas pressure exceeds a predetermined level, the gas can be automatically discharged.

However, the conventional technique is problematic in that gas may not be efficiently discharged due to bad quality of the spring 140. Another disadvantage of the conventional technique resides in that it has a complex construction and many parts, which complicates the production process and increases the time required for production, thereby increasing the production cost.

Further, when a conventional battery is turned over or is tilted to one side, the electrolyte may directly leak from the battery. In the above state, the leaking electrolyte may be partially collected in a space between the valve and the vent cap of the plug in the electrolyte injection port and may corrode the spring.

When the spring of the plug that is placed in the electrolyte injection port of the battery is corroded, the elasticity of the spring is reduced, so that the valve may be undesirably opened even under a low gas pressure, and this may cause the electrolyte to freely leak without resistance. Accordingly, it is required to propose a technique which can efficiently discharge gas from the battery while preventing a leakage of electrolyte without increasing the number of parts, thereby maintaining the production cost at a desired level, and which can recover the leaking electrolyte by collecting the leaking electrolyte and feeding the collected electrolyte into the battery.

Further, the conventional techniques are designed so that most of the gas generated in the battery case can be discharged to the outside both through electrolyte recovery ports and through the electrolyte injection port. In the above state, the gas discharge pressure that functions to discharge the gas to the outside may act on the electrolyte stored in the battery case, thereby undesirably causing a large amount of electrolyte to leak through the recovery ports or through the electrolyte injection port at the same time of the discharge of the gas.

SUMMARY

Accordingly, embodiments of the present invention has been made keeping in mind the above problems occurring in the related art, and the present invention is intended to propose a battery cover for prevention of electrolyte leakage, in which an assembly structure of upper and lower covers is configured in such a way that it forms a labyrinth structure that can increase a resistance to the movement of a leaking electrolyte and can recover the leaking electrolyte while preventing a leakage of the electrolyte.

Another aspect of the present invention is intended to propose a battery cover for prevention of electrolyte leakage, in which lower recovery ports are arrayed in such a way that the lower recovery ports can prevent a leakage of electrolyte even when the battery case is turned over or tilted to one side, thereby preventing the electrolyte from leaking even when the battery case is turned over or tilted to one side at a rapid inclination angle.

A further aspect of the present invention is intended to propose a battery cover for prevention of electrolyte leakage, in which gas discharge ports are formed so as to discharge gas generated in the battery case, thereby preventing the gas from being discharged through the recovery ports and preventing a generation of an electrolyte discharging pressure that may cause the electrolyte to leak, so that the battery cover can prevent a leakage of the electrolyte In order to achieve the above aspects, the present invention provides the following embodiments.

In the first embodiment of the present invention, there is provided a battery cover for prevention of electrolyte leakage, including a lower cover hermetically seated on an upper end of a battery case that stores an electrolyte therein, and an upper cover mounted to an upper end of the lower cover, wherein the upper cover includes: one or more upper cells arranged lengthwise on a lower surface of the upper cover, an upper inner wall extending horizontally and vertically at spaced locations, and an upper labyrinth wall extending vertically in a space between the upper cells and the upper inner wall and connecting the upper cells to the upper inner wall; the lower cover includes: one or more lower cells arranged lengthwise on an upper surface of the lower cover, a lower wall extending horizontally and vertically at spaced locations, and a lower labyrinth wall extending vertically in a space between the lower cells and the lower wall; and the upper labyrinth wall includes a pair of upper labyrinth walls that are spaced apart from each other, and so, when the upper cover is mounted to the upper end of the lower cover, the lower labyrinth wall is placed between the pair of upper labyrinth walls.

In the second embodiment of the present invention, the upper cover includes: an outer wall protruding along an edge of the lower surface of the upper cover and extending horizontally and vertically so that the outer wall forms a rim along the edge of the lower surface of the upper cover; gas discharge ports formed through the outer wall from opposite outermost upper cells of the one or more upper cells so as to discharge gas that is discharged from the battery case; a guide wall extending inclinedly in a vertical direction at a location between the outer wall and the upper inner wall; and one or more upper cell partition walls extending vertically from the upper inner wall so as to partition the one or more upper cells from each other.

In the third embodiment of the present invention, the upper inner wall includes: a first upper inner wall extending along upper ends of the one or more upper cells; second upper inner walls extending vertically from opposite ends of the first upper inner wall and having respective bent parts that are bent inwardly in opposite ends of the upper cover having the gas discharge ports; and a third upper inner wall extending horizontally between ends of the second upper inner walls at a location opposed to the first upper inner wall, thereby forming lower horizontal walls of the one or more upper cells.

In the fourth embodiment of the present invention, the lower cells include: lower recovery ports each having one or more recovery holes so as to recover a leaked electrolyte into the battery case, wherein when the one or more lower cells are arranged lengthwise, the lower recovery ports are formed in the respective lower cells at predetermined location and are leaning toward a center of the lower cover.

In the fifth embodiment of the present invention, each of the lower recovery ports includes: the one or more recovery holes being open at upper ends thereof and formed through a bottom surface of an associated lower cell so as to communicate with the battery case; a recovery port outside wall protruding upward from the bottom surface through which the recovery holes are formed; and one or more cutout holes formed by cutting the recovery port outside wall and allowing the leaked electrolyte to flow therethrough.

In the sixth embodiment of the present invention, the lower cells include: gas discharge holes communicating with the battery case that stores the electrolyte therein, thereby discharging gas from the battery case.

In the seventh embodiment of the present invention, the lower cells further include: micro-holes communicating with the battery case that stores the electrolyte therein, thereby discharging gas from the battery case.

In the eight embodiment of the present invention, the gas discharge holes are formed in the one or more lengthwise arranged lower cells at predetermined locations and are leaning in directions from opposite outermost lower cells to a center of the lower cover.

In the ninth embodiment of the present invention, the micro-holes are formed in opposite outermost cells of the one or more lower cells.

In the tenth embodiment of the present invention, the micro-holes are formed within areas of the lower cells at predetermined locations and are leaning toward a center of the lower cover.

In the eleventh embodiment of the present invention, the upper cells further include: upper dampers horizontally extending within areas of the upper cells, the upper dampers functioning as dams for preventing a movement of the electrolyte.

In the twelfth embodiment of the present invention, the lower cells, on which the upper cells are placed, include: lower recovery ports having one or more recovery holes for recovering leaked electrolyte into the battery case; lower injection ports formed through bottom surfaces of the lower cells so as to inject the electrolyte into the battery case; lower horizontal walls extending horizontally in a way such that the lower horizontal walls are spaced apart from the lower wall; lower cell partition walls extending vertically so as to partition neighboring lower cells from each other; and lower guide walls extending from outside walls of the lower injection ports to the lower horizontal walls after passing the lower recovery ports in such a way that the lower guide walls are spaced apart from the lower cell partition walls, so that the lower guide walls form electrolyte passages for guiding leaked electrolyte from the lower recovery ports or from the lower injection ports to the lower labyrinth wall.

In the thirteenth embodiment of the present invention, the lower cells include: first lower extension walls extending from outside walls of the lower recovery ports in directions toward opposite outermost lower cells; second lower extension walls extending from the lower cell partition walls so as to form walls spaced apart from the lower recovery ports, thereby defining electrolyte passages for guiding leaked electrolyte; and third lower extension walls extending horizontally from outside walls of the lower injection ports at locations opposite to the lower guide walls, thereby forming electrolyte passages between distal ends thereof and lower cells close to the distal ends.

In the fourteenth embodiment of the present invention, each of the lower cells is configured such that a height of a first bottom surface forming an electrolyte passage between the lower guide wall and the lower cell partition wall is higher than a height of a second bottom surface in which both the lower recovery port and the lower injection port are formed.

In the fifteenth embodiment of the present invention, each of the lower cells further includes: an inclined surface sloping down from the first bottom surface to the second bottom surface.

In the sixteenth embodiment of the present invention, the upper cells include: upper injection ports welded to the lower injection ports of the lower cells, thereby sealing the lower injection ports.

In the seventeenth embodiment of the present invention, the upper cells further include: upper dampers extending horizontally within areas of the respective upper cells so as to function as dams for restricting a movement of a leaked electrolyte.

In the eighteenth embodiment of the present invention, the upper cells include: upper horizontal walls extending horizontally so as to allow the upper labyrinth wall to be connected vertically; upper recovery ports that form walls protruding from lower surfaces of the upper cells, the upper recovery ports sealing upper ends of lower recovery ports that recover a leaked electrolyte from the lower cover into the battery case; first upper extension walls extending inclinedly from the upper recovery ports; upper guide walls extending vertically from first ends of the upper horizontal walls; and upper guider walls extending vertically from second ends of the upper horizontal walls and forming passages between the upper guider walls and the upper inner wall that extends in a direction equal to directions of the upper guider walls, thereby guiding electrolyte and gas.

As described above, the present invention is advantageous in that, when the upper and lower covers are assembled with each other, a labyrinth structure is formed by the partition walls of the respective covers, thereby increasing the electrolyte leakage resistance of the battery case and minimizing the leakage of the electrolyte between cells, and increasing the electrolyte recovery ratio.

Another advantage of the present invention resides in that the recovery ports are arrayed in such a way that they are placed at heights higher than the surface levels of the electrolyte stored in the respective partitioned chambers of the battery case even when the battery case is turned over or tilted to one side, so that the present invention can prevent the electrolyte from leaking even in a state in which the battery case tilts to one side.

A further advantage of the present invention resides in that, to prevent the electrolyte from moving in the upper cover even when the battery case is turned over, the partition walls are formed in the upper cover as well as in the lower cover, so that the present invention can prevent the electrolyte from leaking even when the battery case is turned over, and the present invention can quickly recover the electrolyte when the battery case is recovered from the overturned state.

BRIEF DESCRIPTION OF THE DRAWINGS

The above and other aspects, features and other advantages of the present invention will be more clearly understood from the following detailed description when taken in conjunction with the accompanying drawings, in which.

DETAILED DESCRIPTION

Hereinbelow, embodiments of a battery cover for prevention of electrolyte leakage according to embodiments of the present invention will be described in detail with reference to the accompanying drawings.

Figure 1:
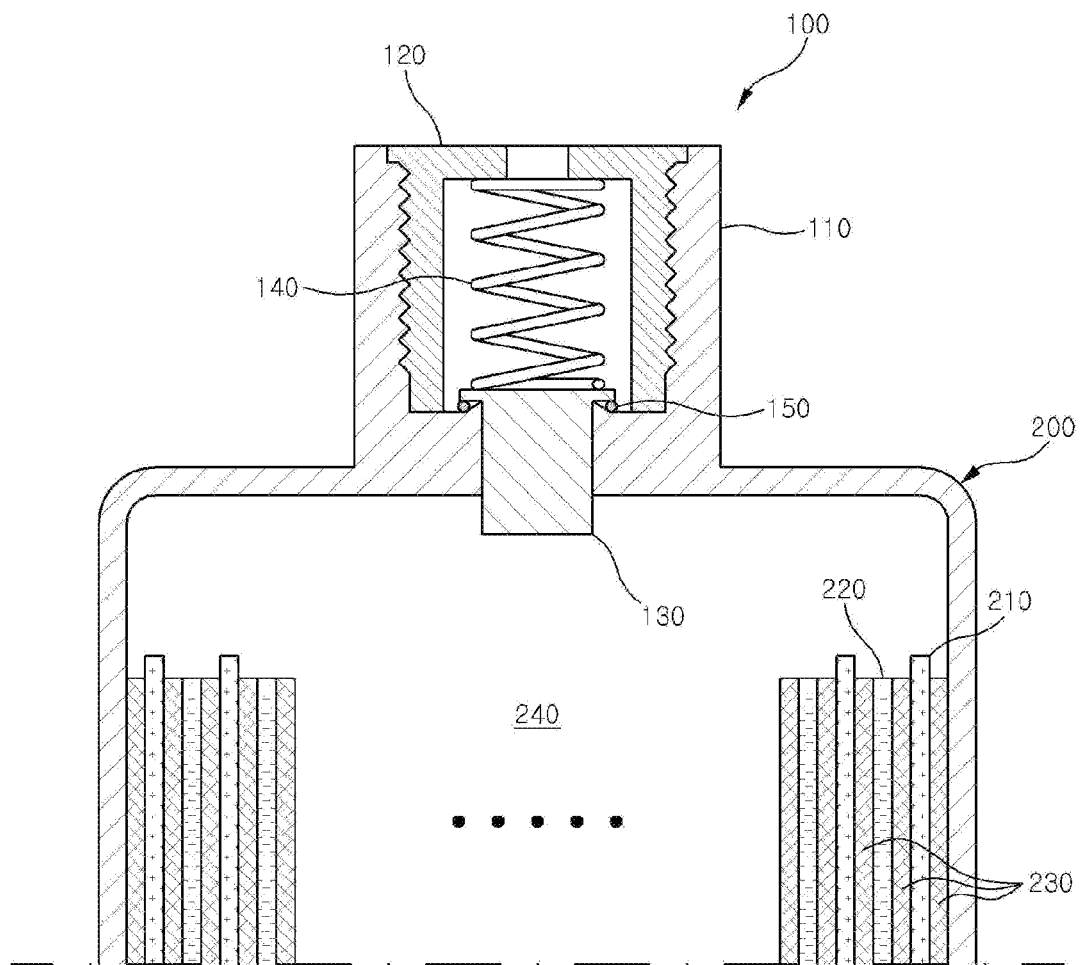
FIG. 1 is a view illustrating a related art technique.
Figure 2:
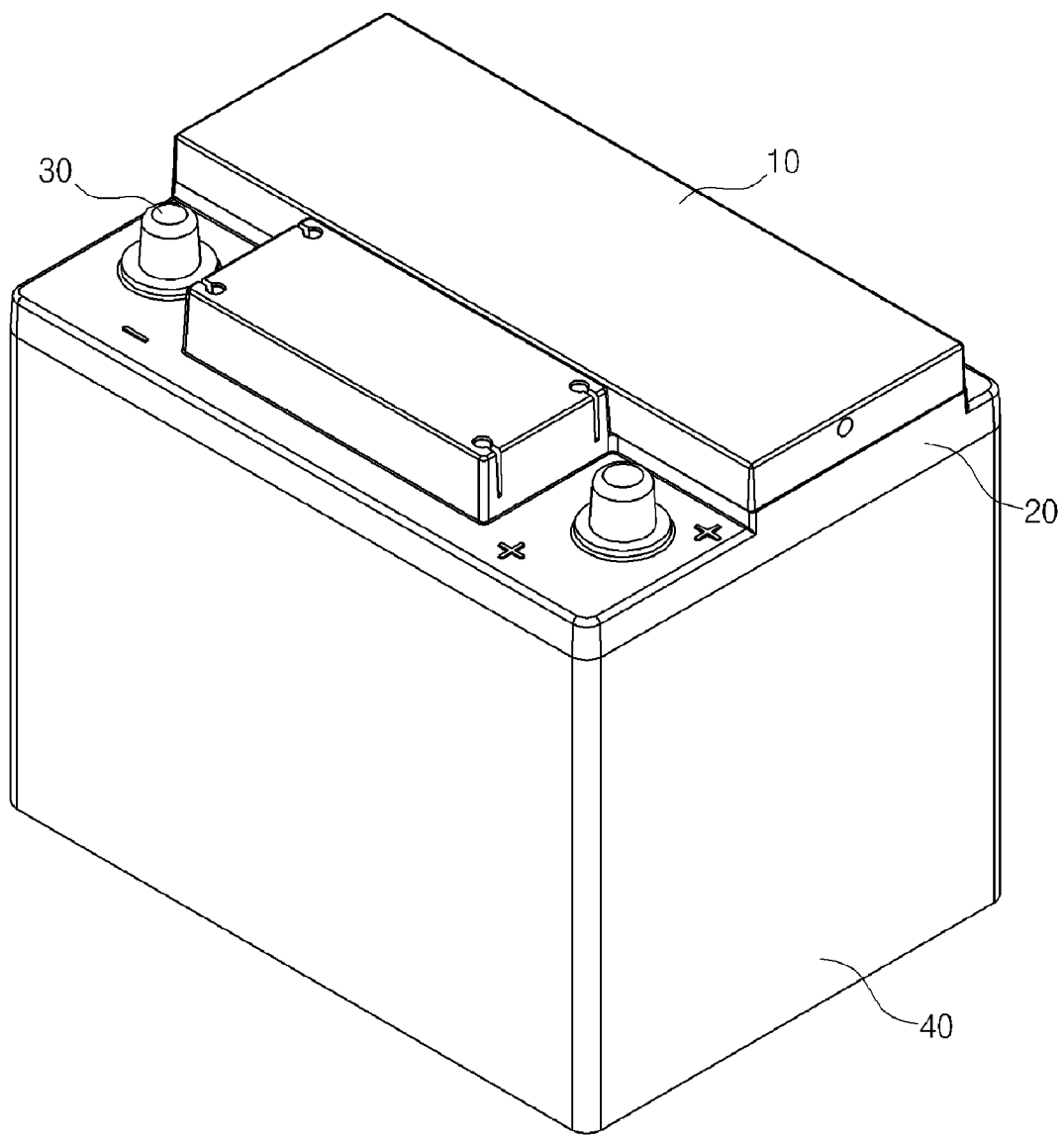
FIG. 2 is a perspective view illustrating a battery according to an embodiment of the present invention.

FIG. 2 is a perspective view illustrating a battery according to an embodiment of the present invention;

As shown in FIG. 2, the battery cover for prevention of electrolyte leakage according to an embodiment of the present invention includes a battery case 40 that stores a battery electrolyte therein, a lower cover 20 that is placed on an upper end of the battery case 40, and an upper cover 10 that is mounted to the upper end of the lower cover 20.

The interior of the battery case 40 is divided by a plurality of partition walls, thereby forming partitioned chambers which store electrolyte therein. The above-mentioned interior structure of the battery case 40 is well known in the related art, and drawings and further explanation will be omitted in the following description.

The lower cover 20 closes and seals the upper end of the battery case 40 that stores electrolyte therein. Here, the lower cover 20 is provided thereon with electric terminals 30, through which electricity produced by a chemical reaction of the electrolyte is input and output. Further, the lower cover 20 is provided with one or more lower cells 21, 22, 23, 21', 22', 23' that are defined by partitioning. Here, the lower cells communicate with the respective partitioned chambers of the battery case.

The upper cover 10 that is mounted to the upper end of the lower cover 20 closes and seals the upper end of the lower cover 20 so as to prevent a gas leakage or an electrolyte leakage from the lower cover 20. To this end, the upper cover is provided with one or more upper cells 11, 12, 13, 11', 12', 13' that are formed by partitioning. Here, the number of the upper cells is equal to that of the lower cells that are defined in the lower cover. The construction of the upper cover 10 is illustrated in FIGS. 3 and 4.

Figure 3:
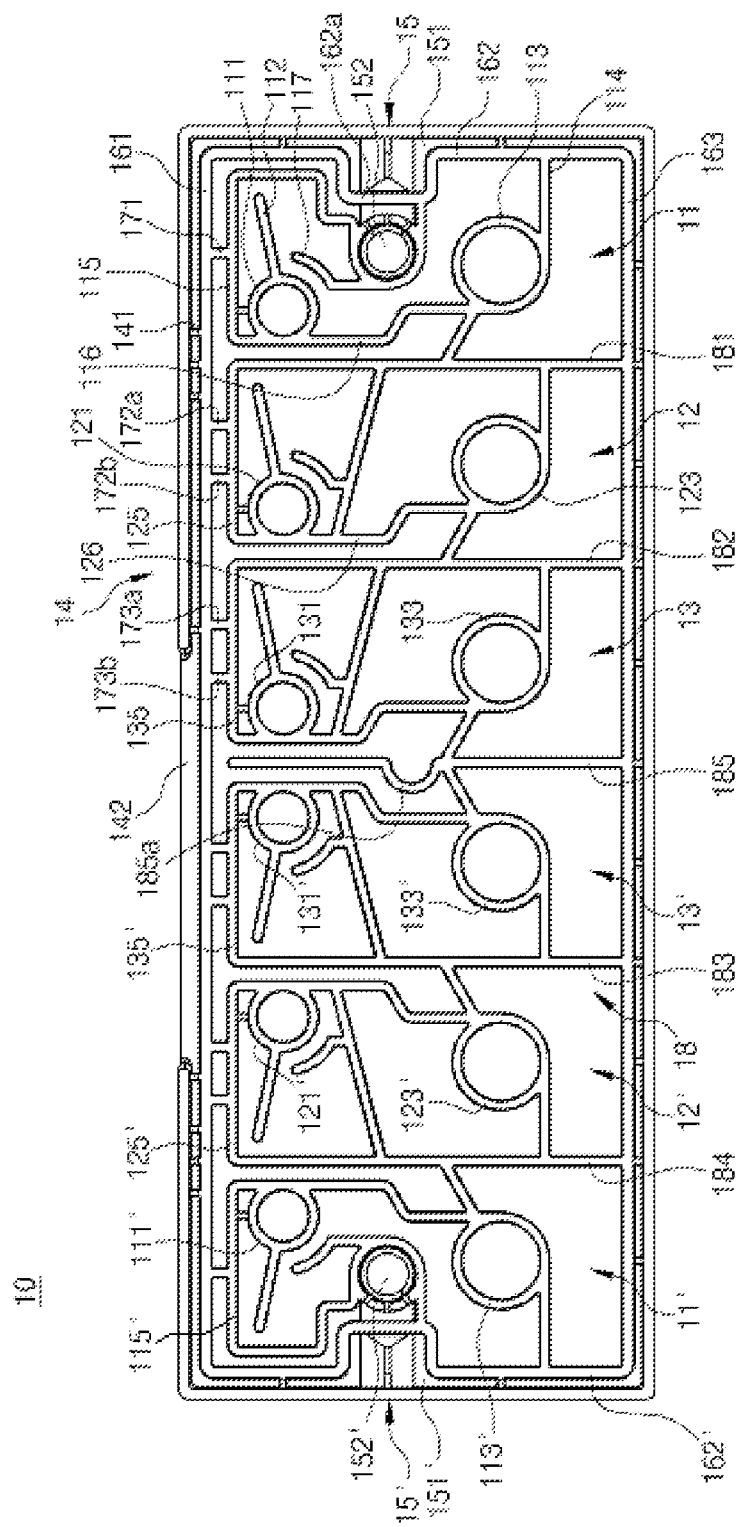
FIG. 3 is a bottom plane view of an upper cover of a battery cover for prevention of electrolyte leakage according to an embodiment of the present invention.

FIG. 3 is a bottom plane view of the upper cover of the battery cover for prevention of electrolyte leakage according to an embodiment of the present invention. FIG. 4 is an enlarged view illustrating a cell of the upper cover of the battery cover for prevention of electrolyte leakage according to an embodiment of the present invention.

Figure 4:
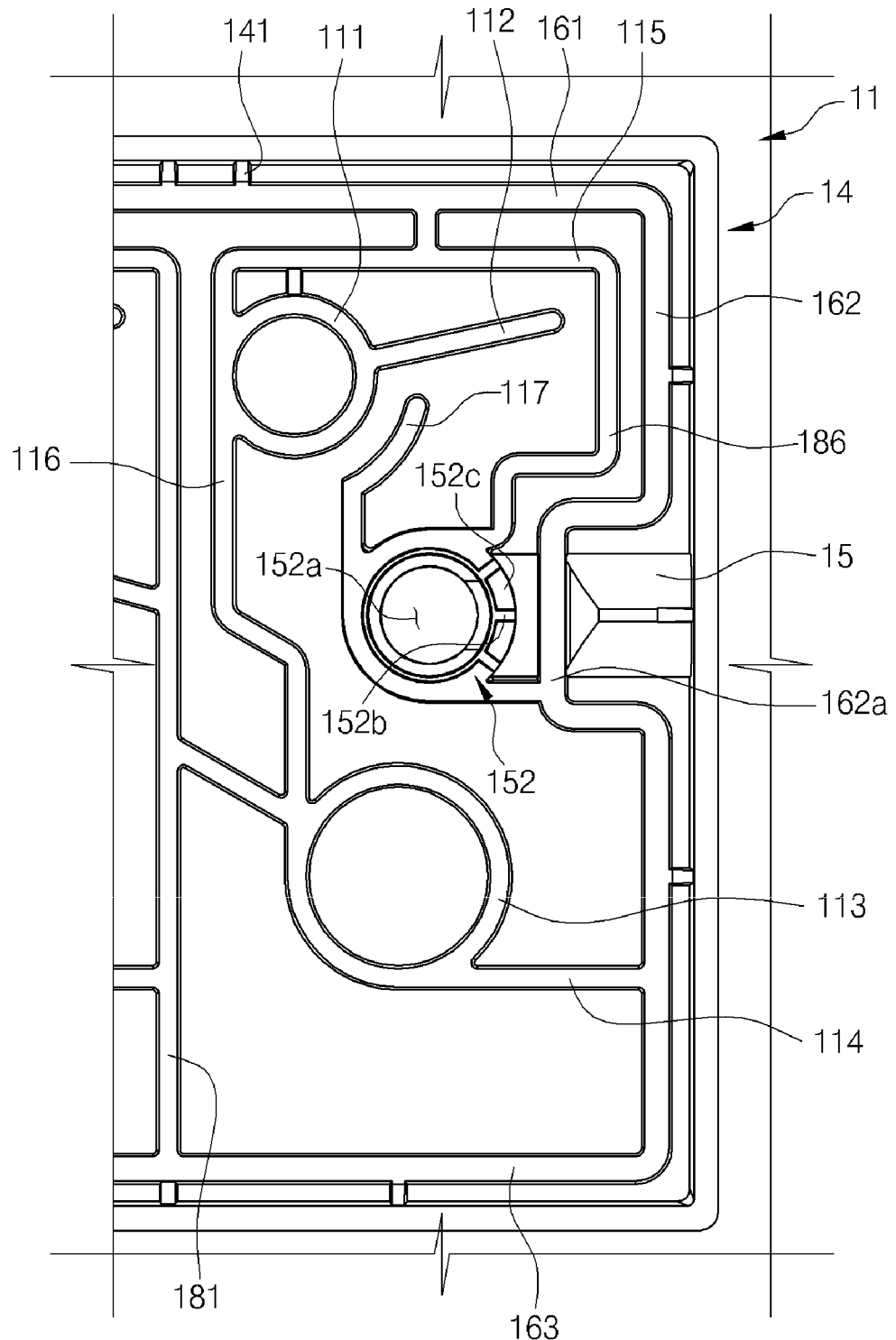
FIG. 4 is an enlarged view illustrating a cell of the upper cover of the battery cover for prevention of electrolyte leakage according to an embodiment of the present invention.

As shown in FIGS. 3 and 4, the upper cover 10 is mounted to the upper end of the lower cover 20 so that it can seal the lower cover 20. To this end, the interior of the upper cover 10 is partitioned into the same number of upper cells 11, 12, 13, 11', 12', 13' as that of the one or more lower cells 21, 22, 23, 21', 22', 23' that are formed in the lower cover 20.

The upper cover 10 forms a flat surface on the upper surface thereof, and includes on the lower surface thereof one or more upper cells 11, 12, 13, 11', 12', 13' that are arranged on the lower surface in one direction; an outer wall 14 that extends in horizontal and vertical directions so as to form a rim along the edge of the lower surface of the upper cover 10; gas discharge ports 15, 15' that extend from opposite outermost cells 11, 11' of the one or more upper cells 11, 12, 13, 11', 12', 13' to the outer wall 14 so as to discharge gas; an upper inner wall 161, 162, 163 that is formed by protruding inside the outer wall 14 and extending in horizontal and vertical directions, thereby forming spaces for defining the one or more upper cells 11, 12, 13, 11', 12', 13'; and upper cell partition walls 18 that extend inside the upper inner wall in vertical directions, thereby partitioning the one or more upper cells from each other.

The gas discharge ports 15, 15' are respectively formed in the opposite outermost cells 11, 11' of the one or more upper cells 11, 12, 13, 11', 12', 13'. For example, a first upper cell 11 of the one or more upper cells 11, 12, 13, 11', 12', 13' is formed in a first end of the upper cover 10, and a sixth upper cell 11' of the one or more upper cells 11, 12, 13, 11', 12', 13' is formed in a second end of the upper cover 10. Here, the first upper cell 11 communicates with a first gas discharge port 151 in the first end of the upper cover, and the sixth upper cell 11' communicates with a second gas discharge port 151' in the second end of the upper cover.

The outer wall 14 is a wall that is formed by protruding along the edge of the lower surface of the upper cover 10 and by extending in the horizontal and vertical directions. The outer wall 14 extends in the vertical direction in opposite ends of the upper cover, in which the first gas discharge port 151 and the second gas discharge port 151' are formed through the outer wall 14.

Here, either of the horizontal parts of the outer wall 14 is partially cut so as to form a locking cutout 142 that is locked to a locking protrusion (not shown) of the lower cover 20 when the upper cover 10 is placed on the upper end of the lower cover 20.

The upper inner wall includes: a first upper inner wall 161 that extends horizontally along the upper ends of the one or more upper cells 11, 12, 13, 11', 12', 13'; second upper inner walls 162, 162' that extend vertically from opposite ends of the first upper inner wall 161 and have respective bent parts 162a which are bent inwardly in the opposite ends of the upper cover 10 having the first gas discharge port 151 and the second gas discharge port 151'; and a third upper inner wall 163 that extends horizontally between the ends of the second upper inner walls 162, 162' at a location opposed to the first upper inner wall 161.

Here, the first upper inner wall 161 is formed by extending horizontally at a location between the upper horizontal part of the outer wall 14 and the one or more upper cells. Particularly, the first upper inner wall 161 is connected both to guide walls 141 that extend inclinedly from the outer wall 14 and to one or more upper labyrinth walls 171, 172a, 172b, 173a, 173b that extend from the one or more upper cells and form a labyrinth structure when the upper cover 10 is mounted to the lower cover 20.

The upper labyrinth walls 171, 172a, 172b, 173a, 173b extend from the one or more upper cells 11, 12, 13, 11', 12', 13' to the first upper inner wall 161. Here, the upper labyrinth walls 171, 172a, 172b, 173a, 173b are spaced apart from each other at predetermined intervals. In an embodiment of the present invention, a pair of upper labyrinth walls 172a, 172b, 173a, 173b be formed in each of the upper cells 11, 12, 13, 11', 12', 13'. Of course, one upper labyrinth wall 171, not the pair of upper labyrinth walls, may be formed in each of the first upper cell 11 and the sixth upper cell 11' that are formed as the outermost upper cells of the upper cover 10.

Here, the upper labyrinth walls 171 that are formed in the outermost upper cells 11, 11' are intended to prevent the electrolyte from leaking from neighboring upper cells 12, 12' into the outermost upper cells 11, 11'.

The upper cell partition walls 18 extend vertically to the third upper inner wall 163 that extends horizontally so that the upper cell partition walls 18 partition the one or more upper cells 11, 12, 13, 11', 12', 13' from each other. The upper cell partition walls 18 include an upper cell center wall 185 that is placed in the center of the upper cover 10 when the upper cover 10 is laid horizontally.

In the following description, the directional term representing a direction toward the upper cell center wall 185 will be referred to as an "inside", and the directional term representing another direction toward the first and second gas discharge ports 151, 151' of the outermost cells 11, 11' of the one or more upper cells 11, 12, 13, 11', 12', 13' will be referred to as an "outside".

The upper cell partition walls 18 include: a first upper cell partition wall 181 that separates the first upper cell 11 and the second upper cell 12 from each other; and a second upper cell partition wall 182 that separates the second upper cell 12 and the third upper cell 13 from each other.

The upper cell partition walls 18 further include a third upper cell partition wall 183 that partitions the fourth upper cell 13' and the fifth upper cell 12' from each other, and a fourth upper cell partition wall 184 that partitions the fifth upper cell 12' and the sixth upper cell 11' from each other.

Here, both the first upper cell partition wall 181 and the second upper cell partition wall 182 extend vertically in a first end area in which the first gas discharge port 151 of upper horizontal walls 115, 125 is located, and both the third upper cell partition wall 183 and the fourth upper cell partition wall 184 extend vertically in a second end area in which the second gas discharge port 151' of upper horizontal walls 115', 125' is located. In other words, the upper cell partition walls 181, 182, 183, 184 extend vertically from the upper horizontal walls 115, 125, 135, 115', 125', 135' in the outermost areas of the respective upper cells.

Further, the upper cell center wall 185 extends vertically at a location between the third upper cell 13 and the fourth upper cell 13', with an upper round part 185a formed in the center of the upper cell center wall 185 so that, when the upper round part 185a is combined with a lower round part 251a of the lower cover 20, the upper and lower round parts 185a and 251a form a cylindrical structure that can increase the resistance to the moving electrolyte.

The one or more upper cells 11, 12, 13, 11', 12', 13' include: upper injection ports 113, 123, 133, 113', 123', 133' that are formed so as to correspond to lower injection ports 211, 221, 231, 211', 221', 231' of the lower cover 20; upper recovery ports 111, 121, 131, 111', 121', 131' that correspond to lower recovery ports 212, 222, 232, 212', 222', 232' of the lower cover 20; gas supply holes 152, 152' that supply gas to the gas discharge ports 15, 15'; upper dampers 114 that extend horizontally outward from the upper injection ports 113, 123, 133, 111', 123', 133' so that the upper dampers 114 extend horizontally in the respective upper cells 11, 12, 13, 11', 12', 13'; first upper extension walls 112 that extend inclinedly from the upper recovery ports 111, 121, 131, 111', 121', 131'; upper guide walls 116, 126 that form passages for guiding electrolyte to the upper labyrinth walls 171, 172a, 172b, 173a, 173b; the upper horizontal walls 115, 125, 135, 115', 125', 135' that extend horizontally in such a way that the upper horizontal walls are spaced apart from the first upper inner wall 161, so that the upper horizontal walls are connected to the upper labyrinth walls 171, 172a, 172b, 173a, 173b; and second upper extension walls 117 that form electrolyte moving passages in cooperation with the upper recovery ports 111, 121, 131, 111', 121', 131'.

The one or more upper cells 11, 12, 13, 11', 12', 13' include: the second upper cell 12 and the third upper cell 13 that are arranged in a direction from the first upper cell 11 or the right-sided outermost cell to the upper cell center wall 185; and the fourth upper cell 13' and the fifth upper cell 12' that are arranged in a direction from the upper cell center wall 185 to the sixth upper cell 11' or the left-sided outermost cell.

Here, the first upper cell 11 and the sixth upper cell 11' are the opposite outermost cells of the upper cover 10 and communicate with the first gas discharge port 151 and the second gas discharge port 151', respectively. The two outermost upper cells 11, 11' include the respective gas supply holes 152, 152' that are not provided in the second to fifth upper cells 12, 13, 13', 12'.

The gas supply holes 152, 152' include: a first gas supply hole 152 that communicates with and supplies gas to the first gas discharge port 151 in the first end of the first upper cell 11; and a second gas supply hole 152' that communicates with and supplies gas to the second gas discharge port 151' in the second end of the sixth upper cell 11'.

The first and second gas supply holes 152, 152' communicate with the first gas discharge port 151 and the second gas discharge port 151', respectively. Here, each of gas supply holes 152, 152' includes: an open inlet 152a; an outside wall 152c that protrudes around the open inlet 152a so as to form a wall surrounding the inlet 152a; and at least one cutout 152b that is formed by cutting the outside wall 152c and guides gas and electrolyte, which leak outside the outside wall 152c, to the inlet 152a.

In other words, each of the gas supply holes 152, 152' functions to guide gas and electrolyte that flow to the inlet 152a through the cutout 152b to an associated one of the first gas discharge port 151 and the second gas discharge port 151'.

The upper dampers 114 are formed in the shape of dams that extend from the respective upper injection ports 113, 123, 133, 111', 123', 133' in directions toward the end areas in which the outermost cells are located and toward the center in which the upper cell center wall 185 is located, so that the dampers 114 extend horizontally in the respective upper cells 11, 12, 13, 11', 12', 13'. Here, the upper dampers 114 function as dams that prevent electrolyte, which leaks both from the upper injection ports 113, 123, 133, 111', 123', 133' and from the upper recovery ports 111, 121, 131, 111', 121', 131', from moving into spaces behind the upper dampers 114.

The upper horizontal walls 115, 125, 135, 115', 125', 135' are walls that extend horizontally in the one or more upper cells 11, 12, 13, 11', 12', 13' and are connected to the respective upper cell partition walls 18 at the outside ends thereof. In other words, the upper horizontal walls 115, 125, 135, 115', 125', 135' are connected to the respective upper cell partition walls 18 at the outside ends thereof and are connected to the respective upper guide walls 116, 126 at the inside ends thereof The first upper extension walls 112 extend from the upper recovery ports 111, 121, 131, 111', 121', 131' in the directions toward the opposite outermost ends so that the ends of the first upper extension walls 112 form spaces in cooperation with the upper cell partition walls 18, thereby defining electrolyte moving passages.

The upper guide walls 116, 126 vertically extend from the inside ends of the upper horizontal walls 115, 125, 135, 115', 125', 135' to the outside surfaces of the upper injection ports 113, 123, 133, 113', 123', 133' after passing the upper recovery ports 111, 121, 131, 111', 121', 131'. Here, the upper guide walls 116, 126 extend vertically in a state in which the upper guide walls 116, 126 are spaced apart from the upper cell partition walls 18. The upper guide walls 116, 126 are combined with respective lower guide walls 218 of the lower cover 20, which will be described later herein, thereby guiding leaking electrolyte to a labyrinth structure that is formed both by the upper labyrinth walls 171, 172a, 172b, 173a, 173b and by lower labyrinth walls 27.

The second upper extension walls 117 extend from the outside surfaces of the gas supply holes 152, 152' in directions toward the first upper extension walls 112 in a state in which the second upper extension walls 117 are spaced apart from the outside surfaces of the upper recovery ports 111, 111'. Here, the second upper extension walls 117 define electrolyte passages between the second upper extension walls 117 and the outside surfaces of the upper recovery ports 111, 111'. Further, to maintain a constant interval between each second upper extension wall 117 and an associated one of the upper recovery ports 111, 111', the second upper extension walls 117 concentrically extend outside the upper recovery ports 111, 111'. In other words, when the outside surfaces of the upper recovery ports 111, 111' form round surfaces, each of the second upper extension walls 117 extends in the form of a round wall.

Further, the distal ends of the second upper extension walls 117 are spaced apart from the first upper extension walls 112 and form gaps between them, thereby guiding the electrolyte to the first upper extension walls 112.

When the upper injection ports 113, 123, 133, 113', 123', 133' are placed on the upper ends of the respective lower injection ports 211, 221, 231, 211', 221', 231' of the lower cover 20, the upper injection ports 113, 123, 133, 113', 123', 133' seal the lower injection ports 211, 221, 231, 211', 221', 231' of the lower cover 20, in which electrolyte is injected into the battery case through the lower injection ports 211, 221, 231, 211', 221', 231'. To realize this function, the upper injection ports 113, 123, 133, 113', 123', 133' have the same shapes as those of the lower injection ports 211, 221, 231, 211', 221', 231'.

Further, the upper recovery ports 111, 121, 131, 111', 121', 131' are required to be hermetically jointed to the upper ends of the respective lower recovery ports 212, 222, 232, 212', 222', 232' of the lower cover 20, so that the upper recovery port 111, 121, 131, 111', 121', 131' has the same shapes as those of the lower recovery ports 212, 222, 232, 212', 222', 232'.

Here, the upper injection ports 113, 123, 133, 111', 123', 133' and the upper recovery ports 111, 121, 131, 111', 121', 131' are placed in respective cells of the upper cover 10 at locations close to the center of the upper cover 10.

Accordingly, the upper injection ports 113, 123, 133 and the upper recovery ports 111, 121, 131 that are formed in the first to third upper cells 11, 12, 13 of the upper cover 10 are placed in the areas of the first to third upper cells 11, 12, 13 at locations near the upper cell center wall 185, respectively.

In the same manner, the upper injection ports 113', 123', 133' and the upper recovery ports 111', 121', 131' that are formed in the fourth to sixth upper cells 11', 12', 13' of the upper cover 10 are placed in the areas of the fourth to sixth upper cells 11', 12', 13' at locations near the upper cell center wall 185, respectively.

Further, each of the first upper cell 11 and the sixth upper cell 11' has an upper guider wall 186 that extends from the outside wall 152c of the gas supply hole 152, 152'. The upper guider walls 186 form passages in cooperation with the respective second upper inner walls 162, 162' so as to guide the electrolyte to the upper labyrinth walls 171.

Hereinbelow, the construction of the lower cover 20 that will be assembled with the above-mentioned upper cover 10 will be described in detail with reference to FIGS. 5 and 6.

Figure 5:
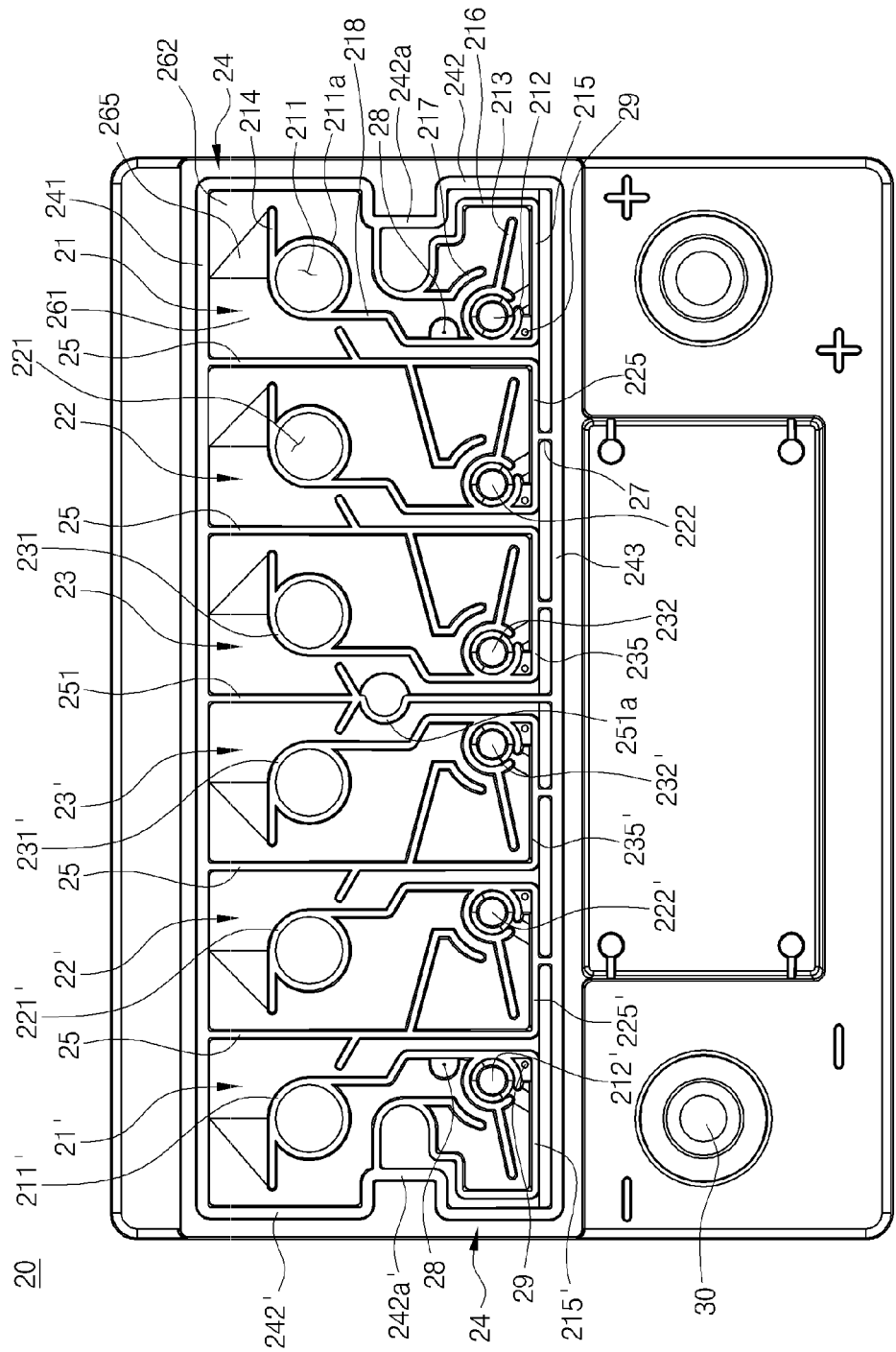
FIG. 5 is a top plan view of a lower cover of the battery cover for prevention of electrolyte leakage according to an embodiment of the present invention.

FIG. 5 is a top plan view of the lower cover of the battery cover for prevention of electrolyte leakage according to an embodiment of the present invention. FIG. 6 is an enlarged view illustrating a cell of the lower cover of the battery cover for prevention of electrolyte leakage according to an embodiment of the present invention.

Figure 6:
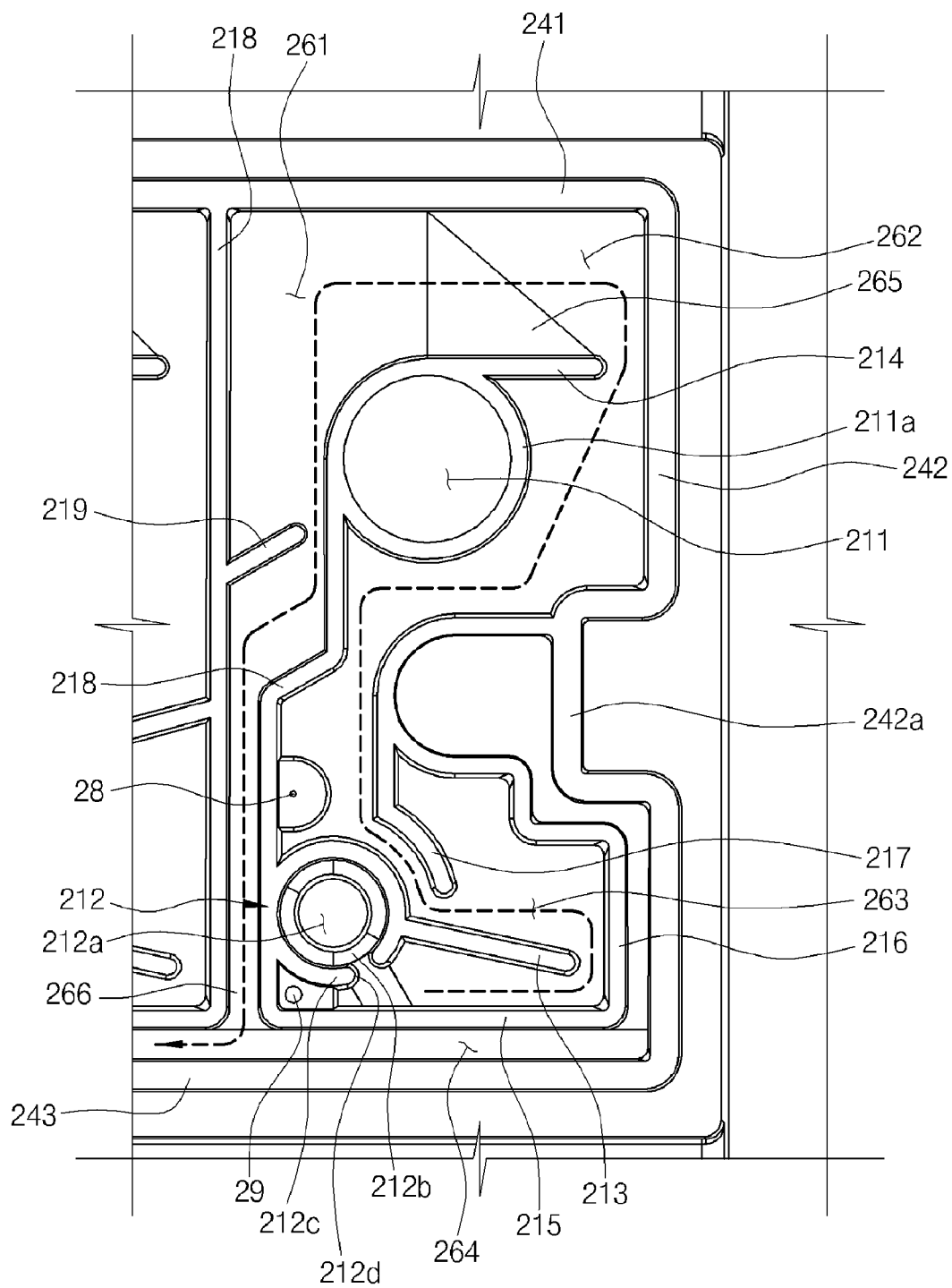
FIG. 6 is an enlarged view illustrating a cell of the lower cover of the battery cover for prevention of electrolyte leakage according to an embodiment of the present invention.

As shown in FIGS. 5 and 6, the lower cover 20 includes: one or more lower cells 21, 22, 23, 21', 22', 23' that are defined as a plurality of partitioned spaces; a lower wall 24 that extends horizontally and vertically so that the one or more lower cells 21, 22, 23, 21', 22', 23' are placed inside the lower wall 24; lower cell partition walls 25 that extend vertically between the one or more lower cells 21, 22, 23, 21', 22', 23' and partition the lower cells from each other; lower labyrinth walls 27 that extend from lower horizontal walls 215, 225, 235, 215', 225', 235' of the respective lower cells 21, 22, 23, 21', 22', 23' to the lower wall 24; and micro-holes 28 and gas discharge holes 29 for discharging gas.

The lower wall 24 includes a first lower wall 241 that extends horizontally at a location outside the horizontal sides of the one or more lower cells 21, 22, 23, 21', 22', 23'; second lower walls 242, 242' that extend vertically from opposite ends of the first lower wall 241; and a third lower wall 243 that extends from ends of the second lower walls 242, 242' so that the third lower wall 243 connects the ends of the second lower walls 242, 242'.

The first lower wall 241 extends horizontally outside the horizontal sides of the one or more lower cells 21, 22, 23, 21', 22', 23', and the second lower walls 242, 242' extend vertically in the first and second end areas of the first and sixth lower cells 21, 21' that are the outermost cells of the one or more lower cells 21, 22, 23, 21', 22', 23'.

Here, the second lower walls 242, 242' extend in such a way that middle portions thereof are bent inward (to the center) so as to form bent parts 242a, 242a' that correspond to the gas discharge ports 15, 15' of the upper cover 10.

The third lower wall 243 extends inward from the opposite outermost cells 21, 21' and defines a space between the third lower wall 243 and the one or more lower cells 21, 22, 23, 21', 22', 23', in which the lower labyrinth walls 27 corresponding to the upper labyrinth walls 171, 172a, 172b, 173a, 173b are formed. Here, the third lower wall 243 defines a passage for guiding the electrolyte between the third lower wall 243 and the one or more lower cells 21, 22, 23, 21', 22', 23' so that the one or more lower labyrinth walls 27 can be formed.

The lower cell partition walls 25 extend between the lower cells and partition the lower cells from each other. The lower cell partition walls 25 include a lower cell center wall 251 that corresponds to the upper cell center wall 185 of the upper cover 10.

Here, in the second lower cell 22 to the fifth lower cell 22', the lower cell partition walls 25 extend vertically at locations remote from the lower cell center wall 251 but close to the outermost cells 21, 21'. Here, the first lower cell 21 and the sixth lower cell 21' are defined in the outermost areas of the lower cover 20 by the second lower walls 242, 242'.

Further, in the second lower cell 22, the third lower cell 23, the fourth lower cell 23' and the fifth lower cell 22', the lower cell partition walls 25 are placed in the outermost areas. Accordingly, the lower cell partition walls 25 are symmetrically formed at respective locations on opposite sides of the lower cell center wall 251.

Here, the lower cell center wall 251 partitions the third lower cell 23 and the fourth lower cell 23' from each other and has a lower round part 251a that is formed by bending the middle portion of the lower cell center wall 251. The lower round part 251a of the lower cover 20 combines with the upper round part 185a of the upper cover 10, so that they form a cylindrical structure.

When the upper cover 10 and the lower cover 20 are assembled with each other, the lower round part 251a and the upper round part 185a are combined with each other and increase the resistance to the electrolyte that moves along the passages defined both by the lower guide walls 218 and by the upper guide walls 116, 126.

The one or more lower cells 21, 22, 23, 21', 22', 23' are arrayed in directions from the outermost lower cells 21, 21', in which the first gas discharge port 151 and the second gas discharge port 151' of the upper cover 10 are placed, to the center in which the lower cell center wall 251 is placed. Here, the partition between the lower cells is realized by the lower cell partition walls 25.

In other words, the first lower cell 21 and the sixth lower cell 21' are defined in the opposite outermost areas of the lower cover 20. Further, the lower recovery ports 212, 222, 232 and the lower injection ports 211, 221, 231 are formed in the first to third lower cells 21, 22, 23, while the lower recovery ports 212', 222', 232' and the lower injection ports 211', 221, 231' of the fourth to sixth lower cells 21', 22', 23' are formed at locations opposite to those of the first to third lower cells 21, 22, 23.

Hereinbelow, the construction of the above-mentioned one or more lower cells will be described in more detail.

The one or more lower cells 21, 22, 23, 21', 22,' 23' include: the lower injection ports 211, 221, 231, 211', 221', 231' through which an electrolyte is injected; the lower recovery ports 212, 222, 232, 212', 222', 232' through which a leaking electrolyte is recovered; the gas discharge holes 29 that are formed through the bottom surfaces of the lower cells so as to discharge gas from the battery case 40, and the micro-holes 28 that are formed exclusively in the outermost lower cells (for example, the first lower cell 21 and the sixth lower cell 21') of the one or more lower cells 21, 22, 23, 21', 22', 23'; first lower extension walls 213 that extend from the outer surfaces of the lower recovery ports 212, 222, 232, 212', 222', 232' so that the distal ends thereof are spaced apart from the lower horizontal walls 215, 225, 235, 215', 225', 235', thereby forming electrolyte moving passages; second lower extension walls 217 that extend from lower guider walls 216 so that the second lower extension walls 217 form a shape corresponding to the outer surfaces of the lower recovery ports 212, 212' and form electrolyte guide passages between the second lower extension walls 217 and the lower recovery ports 212, 212'; third lower extension walls 214 that extend outward from the lower injection ports 211, 221, 231, 211', 221', 231' so as to correspond to the upper dampers 114; the lower guide walls 218 that extend vertically from the lower injection ports 211, 221, 231, 211', 221', 231' so that the lower guide walls 218 correspond to the upper guide walls 116, 126 and define electrolyte guide passages; the lower horizontal walls 215, 225, 235, 215', 225', 235' that extend horizontally from the lower ends of the lower guide walls 218 and form horizontal walls in the respective lower cells; the lower guider walls 216 that form passages for guiding the electrolyte to the gas supply holes 152, 152' of the upper cover 10; and an inclined surface 265 that connects two bottom surfaces 261, 262 having different heights to each other in each of the lower cells 21, 22, 23, 21', 22', 23'.

The lower injection ports 211, 221, 231, 211', 221', 231' are formed downward through the bottom surfaces of the lower cells so that the electrolyte can be injected into the battery case through the lower injection ports. Here, each of the lower injection ports 211, 221, 231, 211', 221', 231' has a circular shape, in which a protruding wall surrounds an electrolyte inlet. Here, in the related art, the upper ends of the lower injection ports are sealed using plugs, so when an electrolyte is collected in the areas around the plugs, the electrolyte may corrode the springs or valves of the plugs and may cause the electrolyte to leak from the battery.

However, in an embodiment of the present invention, the lower injection ports 211, 221, 231, 211', 221', 231' are joined to the upper injection ports of the upper cover 10 through thermal welding or ultrasonic welding so that the present invention can efficiently seal the lower injection ports without using additional parts.

The lower recovery ports 212, 222, 232, 212', 222', 232' are placed in the one or more lower cells 21, 22, 23, 21', 22', 23' and recover the electrolyte leaking from the battery case 40. To realize this function, each of the lower recovery ports 212, 222, 232, 212', 222', 232' includes: a circular bottom surface 212a; one or more recovery holes 212b that are formed outside the bottom surface 212a so as to allow the electrolyte to inlet or outlet; an outside wall 212c that protrudes upward outside both the bottom surface 212a and the recovery holes 212b and surrounds both the bottom surface 212a and the recovery holes 212b; and a cutout hole 212d that is formed by partially cutting the outside wall 212c of the recovery port and allows the leaking electrolyte to flow through it.

The present invention can prevent a leakage of the electrolyte using both the upper dampers 114 and the labyrinth structure that is formed both by the upper cover 10 and by the lower cover 20, so that the present invention can realize a simple construction comprising the one or more recovery holes 212b and the outside wall 212c of the lower recovery ports 212, 222, 232, 212', 222', 232'.

The recovery holes 212b are formed outside the bottom surface 212a and guide the leaking electrolyte into the battery case 40. In the above state, the recovered electrolyte or the leaking electrolyte may be recovered or may leak through passages 263 that are defined between the first lower extension walls 213 and the lower guider walls 216.

Further, the outside wall 212c of each lower recovery port protrudes upward outside both the recovery holes 212b and the bottom surface 212a, in which opposite ends of the outside wall 212c are spaced apart from each other and form the cutout hole 212d. Here, unlike the related art in which a plug is provided in the upper end of the outside wall 212c of each lower recovery port, the present invention does not use such a plug.

Here, the bottom surface 212a is configured such that it has a height different from the heights of the recovery holes 212b. In other words, the bottom surface 212a is formed at a place, the height of which is higher than the heights of the recovery holes 212b so that the leaking electrolyte can flow into the recovery holes 212b.

Here, when the upper cover 10 and the lower cover 20 are assembled with each other into a battery cover, the lower recovery ports 212, 222, 232, 212', 222', 232' and the lower injection ports 211, 221, 231, 211', 221', 231' of the lower cells 21, 22, 23, 21', 22', 23' are joined to the upper recovery ports and the upper injection ports of the upper cover 10, respectively. Accordingly, it is required to form the recovery ports and the injection ports of the lower cells 21, 22, 23, 21', 22', 23' at locations so that the ports are aligned with the recovery ports and the injection ports of the upper cells. In other words, the lower recovery ports 212, 222, 232, 212', 222', 232' and the lower injection ports 211, 221, 231, 211', 221', 231' are formed in respective cells 21, 22, 23, 21', 22', 23' of the lower cover 20 at locations close to the center of the lower cover 20.

For example, when the lower cover 20 includes the first to sixth lower cells 21, 22, 23, 21', 22', 23', the lower recovery port 212 and the lower injection port 211 of the first lower cell 21 that is one of the outermost lower cells 21, 21', in which the gas discharge ports 15, 15' of the upper cover 10 are placed in the outside ends respectively, are formed at locations on opposite side of the first gas discharge port 151. In the same manner, in each of the second lower cell 22 and the third lower cell 23, the lower recovery port 222, 232 and the lower injection port 221, 231 are formed at opposite positions, based on the first gas discharge port 151.

Further, in the sixth lower cell 21' in which the second gas discharge port 151' is placed in an area around the second end of the sixth lower cell 21', the lower recovery port 212' and the lower injection port 211' are formed at respective locations on opposite sides of the second gas discharge port 151'. In the same manner, in each of the fourth lower cell 23' and the fifth lower cell 22', the lower recovery port 232', 222' and the lower injection port 231', 221' are formed at opposite locations, based on the second gas discharge port 151'.

Accordingly, in the first to third lower cells 21, 22, 23, the lower recovery ports 212, 222, 232 and the lower injection ports 211, 221, 231 are placed in areas around the second ends of the respective lower cells 21, 22, 23. In the fourth to sixth lower cells 23', 22', 21', the lower recovery ports 232', 222', 212' and the lower injection ports 231', 221', 211' are placed in areas around the first ends of the respective lower cells 23', 22', 21'.

Brief described, the one or more lower cells 21, 22, 23, 21', 22', 23' are arrayed in such a way that the lower recovery ports 212, 222, 232, 212', 222', 232' and the lower injection ports 211, 221, 231, 211', 221', 231' are placed at predetermined location and are leaning in directions from the opposite outermost ends, in which the first and second gas discharge ports 151, 151' are placed respectively, to the center of the lower cover 20. In other words, the lower recovery ports and the lower injection ports of the lower cover 20 are arrayed on symmetric locations on opposite sides of the lower cell center wall 251.

The operational function that can be realized by the above-mentioned arrangement of the lower recovery ports 212, 222, 232, 212', 222', 232' and the lower injection ports 211, 221, 231, 211', 221', 231' will be described later herein.

Each of the gas discharge holes 29 is formed at a location between the outside wall 212c of an associated lower recovery port 212, 222, 232, 212', 222', 232' and an associated lower horizontal wall 215, 225, 235, 215', 225', 235' and functions to discharge gas from the battery case 40. Here, the gas discharge holes 29 are arranged in the respective lower cells 21, 22, 23, 21', 22', 23' at predetermined location and are leaning in directions from the opposite outermost ends to the center of the lower cover 20 in the same manner as that described for the lower recovery ports 212, 222, 232, 212', 222', 232' and the lower injection ports 211, 221, 231, 211', 221', 231'.

The lower guide walls 218 extend vertically from the lower injection ports 211, 221, 231, 211', 221', 231' so that they are spaced apart from the lower cell partition walls 25, 251, thereby forming electrolyte passages 266. Further, the lower guide walls 218 have a shape corresponding to that of the upper guide walls 116, 126 of the upper cover 10.

The micro-holes 28 are formed through flat surfaces that are in close contact with the lower guide walls 218, so that the micro-holes 28 communicate with the interior of the battery case 40, thereby discharging gas from the battery case 40.

The third lower extension walls 214 have a shape correspond to that of the upper dampers 114 of the upper cover 10 and extend horizontally from the outside wall 211a of the lower injection ports 211, 221, 231, 211', 221', 231'. Here, the distal ends of the third lower extension walls 214 are spaced apart from the second lower walls 242, 242' of the lower wall 24, thereby forming electrolyte passages.

The lower horizontal walls 215, 225, 235, 215', 225', 235' are walls that extend horizontally in the respective lower cells 21, 22, 23, 21', 22', 23' in such a way that predetermined gaps are defined between the lower horizontal walls and the third lower wall 243. Here, the lower horizontal wall 215 is connected to the end of the lower guider wall 216 at the first end thereof and is connected to the lower guide wall 218 at the second end thereof Accordingly, the lower guide walls 218 form electrolyte passages in cooperation with the lower cell partition walls 25, 251 and the electrolyte passages communicate with the electrolyte passages that are defined between the third lower wall 243 and the lower horizontal walls 215, 225, 235, 215', 225', 235'.

The lower guider walls 216 are combined with the upper guider walls 186 of the upper cover 10, thereby defining electrolyte guide passages through which the electrolyte can be guided to the gas supply holes 152, 152' of the upper cover 10. Here, the lower guider walls 216 are formed outside receptacle portions in which the gas discharge ports 15, 15' of the upper cover 10 are placed. The lower guider walls 216 extend to the lower horizontal walls 215, 215' along the second lower walls 242, 242' in a state in which the lower guider walls 216 are spaced apart from the second lower walls 242, 242', thereby defining electrolyte passages between them. Accordingly, the lower guider walls 216 define electrolyte passages in cooperation with the second lower walls 242, 242' and the electrolyte passages communicate with the electrolyte passages that are defined between the third lower wall 243 and the lower horizontal walls 215, 215'.

The first lower extension walls 213 extend inclinedly from the outside walls 212c of the lower recovery ports 212, 212' so that the distal ends of the first lower extension walls 213 can be spaced apart from the lower guider walls 216 or from the lower horizontal walls 215, 215', thereby defining the electrolyte passages 263 between them.

The second lower extension walls 217 have a shape (for example, a round shape) corresponding to the shape of the outside walls of the lower recovery ports 212, 212'. The second lower extension walls 217 extend from the outside walls of the gas discharge ports 15, 15' so that the electrolyte passages 263 can be defined between the second lower extension walls 217 and the outside walls 212c of the recovery ports 212, 212'. Here, each of the second lower extension walls 217 may be configured such that the wall 217 can maintain a constant gap between the wall 217 and the outside wall 212c of an associated lower recovery port 212, 212' within the entire length of the second lower extension wall 217.

Each of the inclined surfaces 265 is inclinedly formed between the first bottom surface 261, on which a passage is defined between the lower guide wall 218 and the lower cell partition wall 25, 251, and the second bottom surface 262 in which both the lower injection port 211, 221, 231, 211', 221', 231' and the lower recovery port 212, 222, 232, 212', 222', 232' are formed. The first bottom surface 261 is placed at a height higher than the second bottom surface 262. The function of the inclined surfaces 265 is to delay the movement of the leaking electrolyte in directions from the outermost ends to the center, and to quickly recover the electrolyte through the lower recovery ports 212 by quickly moving the electrolyte in directions from the center to the outermost ends.

A protrusion wall 219 extends inclinedly from each of the lower cell partition walls 25, 251 and increases the resistance to the movement of the electrolyte in the passages 266 that are defined between the lower guide walls 218 and the lower cell partition walls 25, 251.

The lower labyrinth walls 27 extend vertically between the lower horizontal walls 215, 225, 235, 215', 225', 235' and the third lower wall 243. As shown in FIG. 5, one lower labyrinth wall 27 is formed in each of the second to fifth lower cells 22', as an example. However, it should be understood that at least one lower labyrinth wall may be formed in each lower cell.

Hereinbelow, the electrolyte leakage and the electrolyte recovery in a state in which the above-mentioned upper and lower covers 10 and 20 of an embodiment of the present invention are assembled with each other into a battery cover will be described in detail. For ease of description, the first upper cell 11 of the upper cover 10 and the first lower cell 21 of the lower cover 20 will be referred as examples of the upper and lower cells 11, 12, 13, 11', 12', 13', 21, 22, 23, 21', 22', 23' in the following description, when necessary.

First, a worker places the lower cover 20 on the battery case 40 and injects an electrolyte into the battery case 40 through the lower injection port 211. Thereafter, the worker securely mounts the upper cover 10 to the upper end of the lower cover 20 using, for example, an ultrasonic welding process or another method.

In the above state, the upper injection port 113 of the upper cover 10 is hermetically seated on the lower injection port 211 of the lower cover 20. Further, the lower end of the second upper inner wall 162 of the upper cover 10 is seated on the upper end of the second lower walls 242 of the lower cover 20. Further, the gas discharge port 15 of the upper cover 10 discharges gas that has been introduced through a passage defined between a wall, which is formed both by the lower guider wall 216 and by the upper guider wall 186, and another wall which is formed both by the second lower wall 242 and the second upper inner wall 162.

Here, the upper recovery port 111 of the upper cover 10 is seated on the lower recovery port 212 of the lower cover 20, so that the upper end of the lower recovery port 212 can be efficiently sealed. Therefore, a leaking electrolyte can be efficiently recovered through the one or more cutout holes 212d that are formed in the lower recovery port 212.

Further, the upper end of the third lower extension wall 214 of the lower cover 20 comes into close contact with the upper damper 114 of the upper cover 10 and forms an electrolyte passage in cooperation with the second lower wall 242. Further, the lower end of the upper guide wall 116 and the upper end of the lower guide wall 218 are joined with each other, thereby forming an electrolyte passage in cooperation with the upper cell partition wall 181.

Here, the original function of the lower recovery port 212 is to recover the electrolyte into the battery case. However, when the battery tilts to one side or is turned over, the electrolyte may leak from the battery case through the lower recovery port 212. In an effort to prevent this leakage, in the related art, a plug is inserted into the lower recovery port 212. However, in an embodiment of the present invention, the upper labyrinth walls 171, 172a, 172b, 173a, 173b, the lower labyrinth walls 27, the upper dampers 114 and the lower recovery ports 212, 222, 232, 211', 222', 232' are arrayed at predetermined location and are leaning towards the center of the battery cover, so that the present invention can minimize the leakage of the electrolyte and can intercept a movement of the electrolyte to neighboring cells. Accordingly, in an embodiment of the present invention, it is not required to use plugs in the lower recovery ports 212.

Here, the electrolyte that leaks from the lower recovery port 212 flows through the passage as shown by an arrow in FIG. 6. In other words, the electrolyte leaks through the cutout hole 212d of the lower recovery port 212 and primarily flows through the passage that is defined between the first lower extension wall 213 and the lower guider wall 216. Thereafter, the electrolyte flows to the third lower extension wall 214 through the passage that is defined between the second lower extension wall 217 and the lower recovery port 212. Further, the electrolyte reaches the inclined surface through the electrolyte passage that is defined between the third lower extension wall 214 and the second lower wall 242.

Here, the electrolyte faces with resistance from the labyrinth structure that is formed both by the second lower extension wall 217 and by the first lower extension wall 213, so that the flowing speed of the electrolyte is greatly reduced. The movement of the electrolyte faces further resistance from the inclined surface 265.

In the above state, the amount of the electrolyte that has faced resistance from the inclined surface 265 is gradually increased and passes over the inclined surface 265, so that the electrolyte flows through the electrolyte passage that is defined between the lower guide wall 218 and the lower cell partition wall 25 and flows into the electrolyte passage 264 that is defined between the lower horizontal wall 215 and the third lower wall 243, thereby reaching the labyrinth structure that is formed both by the upper labyrinth wall 171, 172a, 172b, 173a, 173b and the lower labyrinth wall 27.

In the upper cover 10, the upper labyrinth wall comprises a pair of upper labyrinth walls 172a, 172b that are spaced apart from each other. In the above state, the lower labyrinth wall 27 is placed below the middle portion between the pair of upper labyrinth walls 172a, 172b. The above-mentioned arrangement of upper and lower labyrinth walls is shown in FIG. 7.

Figure 7:
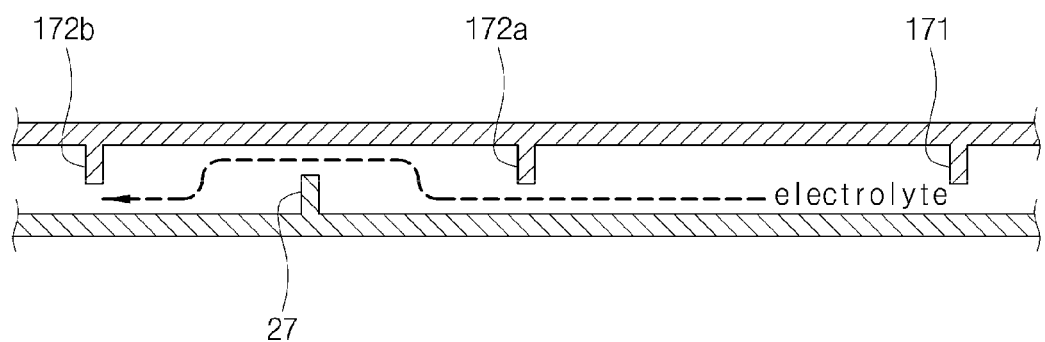
FIG. 7 is a side sectional view illustrating a labyrinth structure of the battery cover for prevention of electrolyte leakage according to an embodiment of the present invention.

FIG. 7 is a side sectional view illustrating the labyrinth structure of the battery cover for prevention of electrolyte leakage according to an embodiment of the present invention.

As shown in FIG. 7, when the upper cover 10 is placed on the upper end of the lower cover 20, the upper end of the lower labyrinth wall 27 is placed between the upper labyrinth walls 172a, 172b, that are spaced apart from each other.

Accordingly, the electrolyte that leaks through the lower recovery port 212, the micro-hole 28 or the gas discharge hole 29 flows through the electrolyte passage that is defined between the third lower extension wall 214 and the second lower wall 242, and passes over the inclined surface, and flows through the electrolyte passage that is defined between the lower guide wall 218 and the lower cell partition wall 25. In the above state, the electrolyte passes below the lower end of the upper labyrinth wall 172a and flows upward so as to pass over the lower labyrinth wall 27 and flows downward so as to pass below the lower end of the upper labyrinth wall 172b. Accordingly, the resistance to the movement of the electrolyte is increased so that the electrolyte cannot move to a neighboring cell or to the gas discharge port 15, but returns to its original place, thereby being efficiently recovered through the lower recovery port 212.

In other words, in an embodiment of the present invention, the electrolyte that leaks through the lower recovery ports 212, 222, 232, 212', 222', 232', the gas discharge holes 29 or the micro-holes 28 is restricted from moving to neighboring cells by the labyrinth structure that is formed both by the upper labyrinth walls 171, 172a, 172b, 173a, 173b and by the lower labyrinth walls 27, but is efficiently recovered by the lower recovery ports 212, 222, 232, 212', 222', 232' of the respective lower cells.

Further, in the battery cover for prevention of electrolyte leakage according to an embodiment of the present invention, the upper recovery ports 111, 121, 131, 111', 121', 131' and the lower recovery ports 212, 222, 232, 212', 222', 232' are arrayed in the respective cells of the upper cover 10 and the lower cover 20 at predetermined location and are leaning toward the centers of the covers 10, 20. This arrangement of the upper recovery ports and the lower recovery ports is intended to recover the leaking electrolyte to the recovery ports by restricting a movement of the leaking electrolyte when the electrolyte leaks from the battery case in a state in which the battery tilts to one side.

Further, in an embodiment of the present invention, the upper dampers 114 are provided in the upper cover 10 so that, even when the battery is turned over, the electrolyte that is placed in an area between the upper injection port 113 and the upper recovery port 111 can be prevented from moving to another area.

The leaning state and the overturned state of the battery will be described in detail with reference to FIGS. 8 and 9, respectively.

Figure 8:
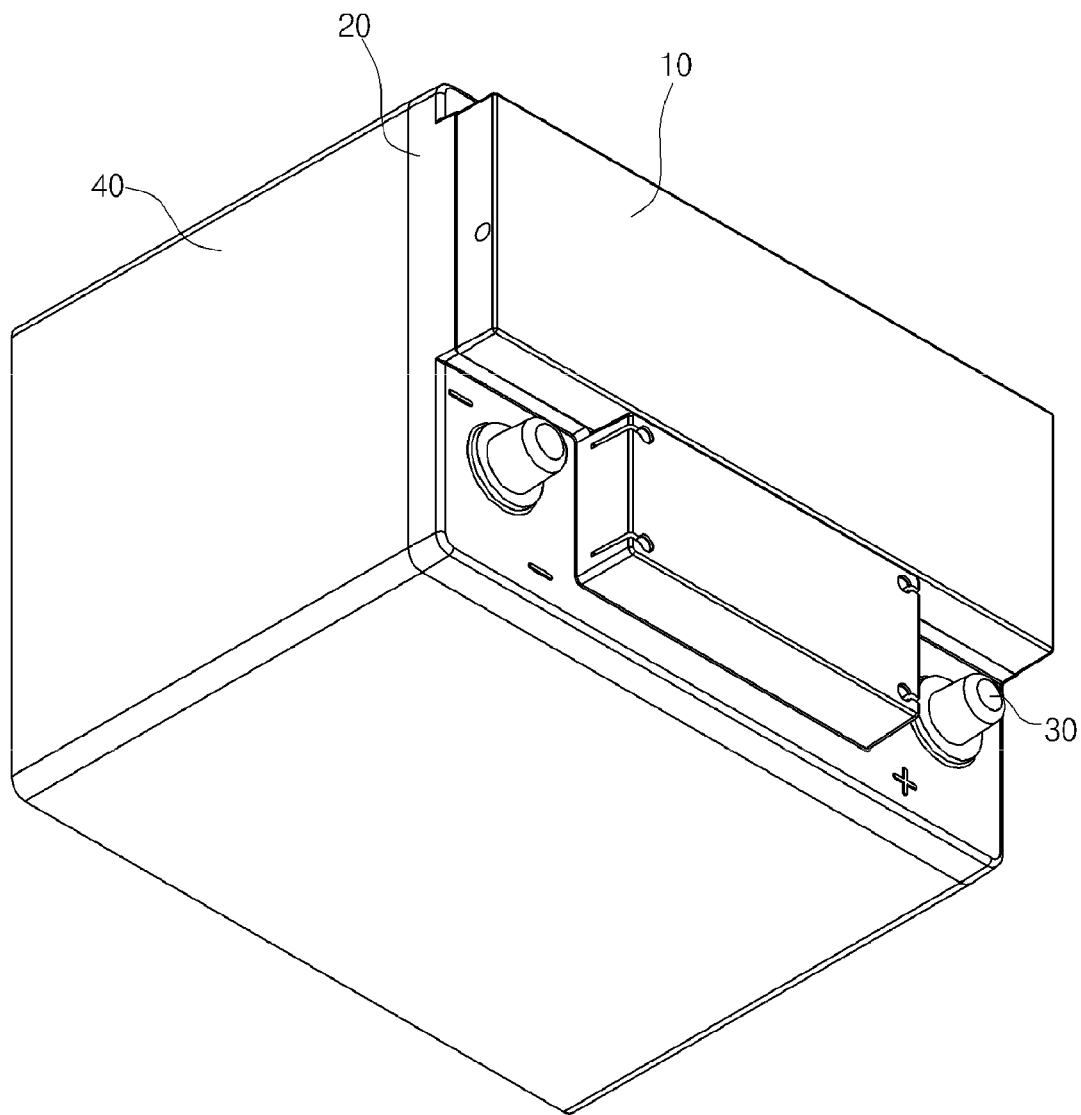
FIGS. 8 to 13 are plane views illustrating a tilting state of the lower cover of the battery cover for prevention of electrolyte leakage according to an embodiment of the present invention.
Figure 9:
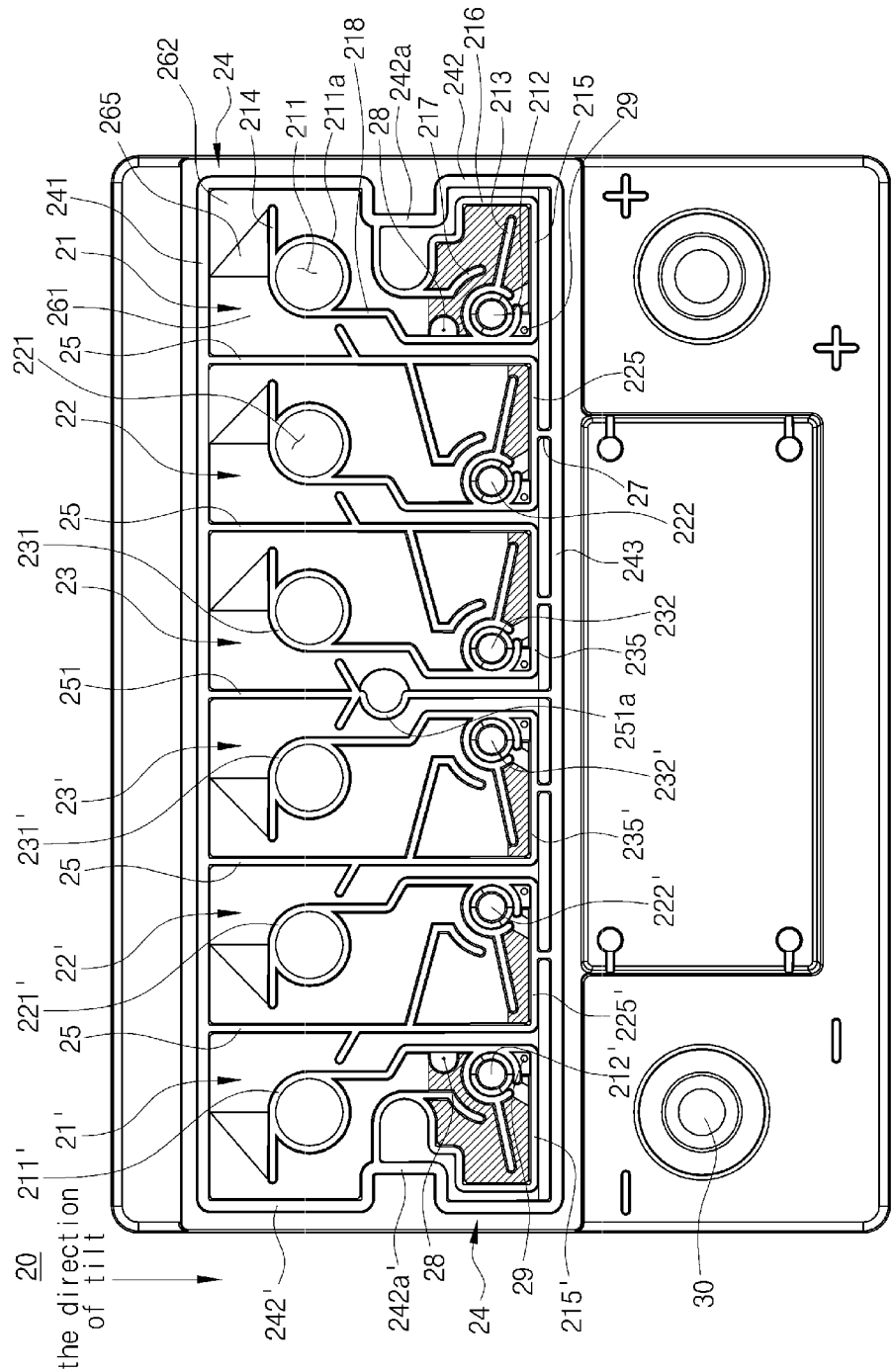

FIGS. 8 to 13 are views illustrating a tilting state of the lower cover of the battery cover for prevention of electrolyte leakage according to an embodiment of the present invention, in which FIG. 8 is a perspective view illustrating a tilting state of the battery, in which the upper cover is placed to face the front, and FIG. 9 is a plane view illustrating a state in which the electrolyte is leaking in the tilting state of the lower cover shown in FIG. 8.

FIGS. 8 and 9 show that a battery to which the embodiment of the present invention is adapted tilts to one side because a vehicle having the battery moves along a steep slope or because a user moves the battery in a state in which the battery is tilted to the side, or because the battery tilts to the side due to an external shock so that the upper part of the battery faces the front in which the terminals are placed in a lower part and the upper cover 10 and the lower cover 20 are placed in an upper part.

As shown in the drawings, in the leaning lower cells 21, 22, 23, 21', 22', 23', the lower injection ports 211, 221, 231, 211', 221', 231' are placed in upper parts, and the recovery ports 212, 222, 232, 212', 222', 232' are placed in lower parts, so that the electrolyte may leak through the recovery ports 212, 222, 232, 212', 222', 232' of the lower cells 11, 12, 13, 11', 12', 13'.

However, the embodiment of the present invention includes the micro-holes 28 and the gas discharge holes 29, so that gas can be discharged both through the micro-holes 28 and through the gas discharge holes 29. Therefore, in an embodiment of the present invention, a pressure that may push the electrolyte to the recovery ports 212, 222, 232, 212', 222', 232' is not generated, so that the leakage amount of the electrolyte in the above-mentioned leaning state can be efficiently limited.

For example, when a battery that is provided with neither the micro-holes 28 nor the gas discharge holes 29 in the lower cells 21, 22, 23, 21', 22', 23' tilts to one side or is overturned, a gas discharge pressure that pushes gas to the outside through the recovery ports 212, 222, 232, 212', 222', 232' acts in the battery case 40 and, in the above state, a great amount of electrolyte may easily leak from the battery case along with the gas discharged by the gas discharge pressure.

However, the present invention includes the gas discharge holes 29 in the respective lower cells 21, 22, 23, 21', 22', 23'. Particularly, the present invention further includes the micro-holes 28 in the outmost lower cells that are the first lower cell 21 and the sixth lower cell 21'. Accordingly, gas discharge passages for discharging gas from the battery case 40 are defined in the battery cover of the embodiment of the present invention, so that a pressure that may discharge the electrolyte from the battery case to the outside is not generated in the battery.

Figure 10:
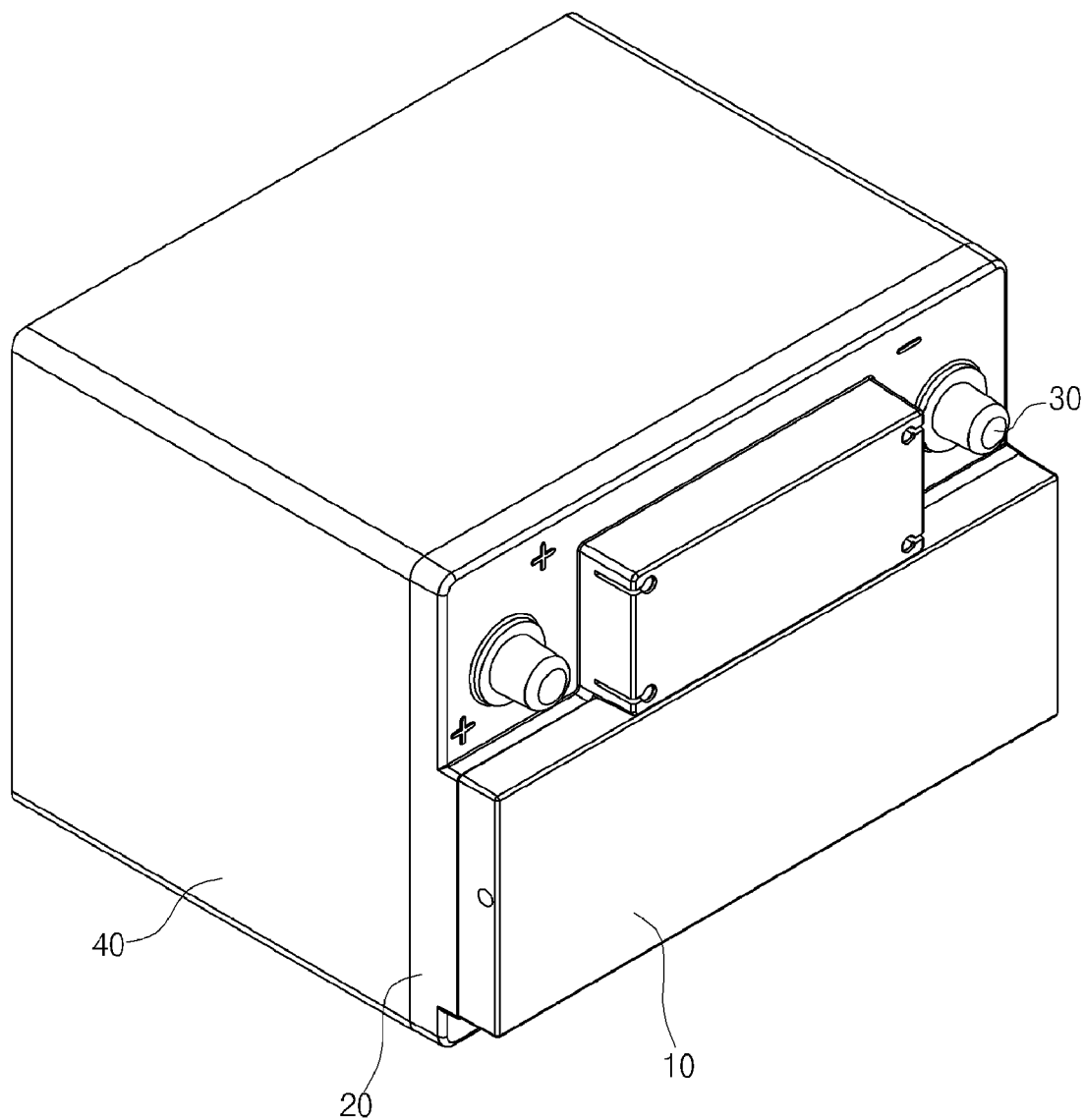
Figure 11:
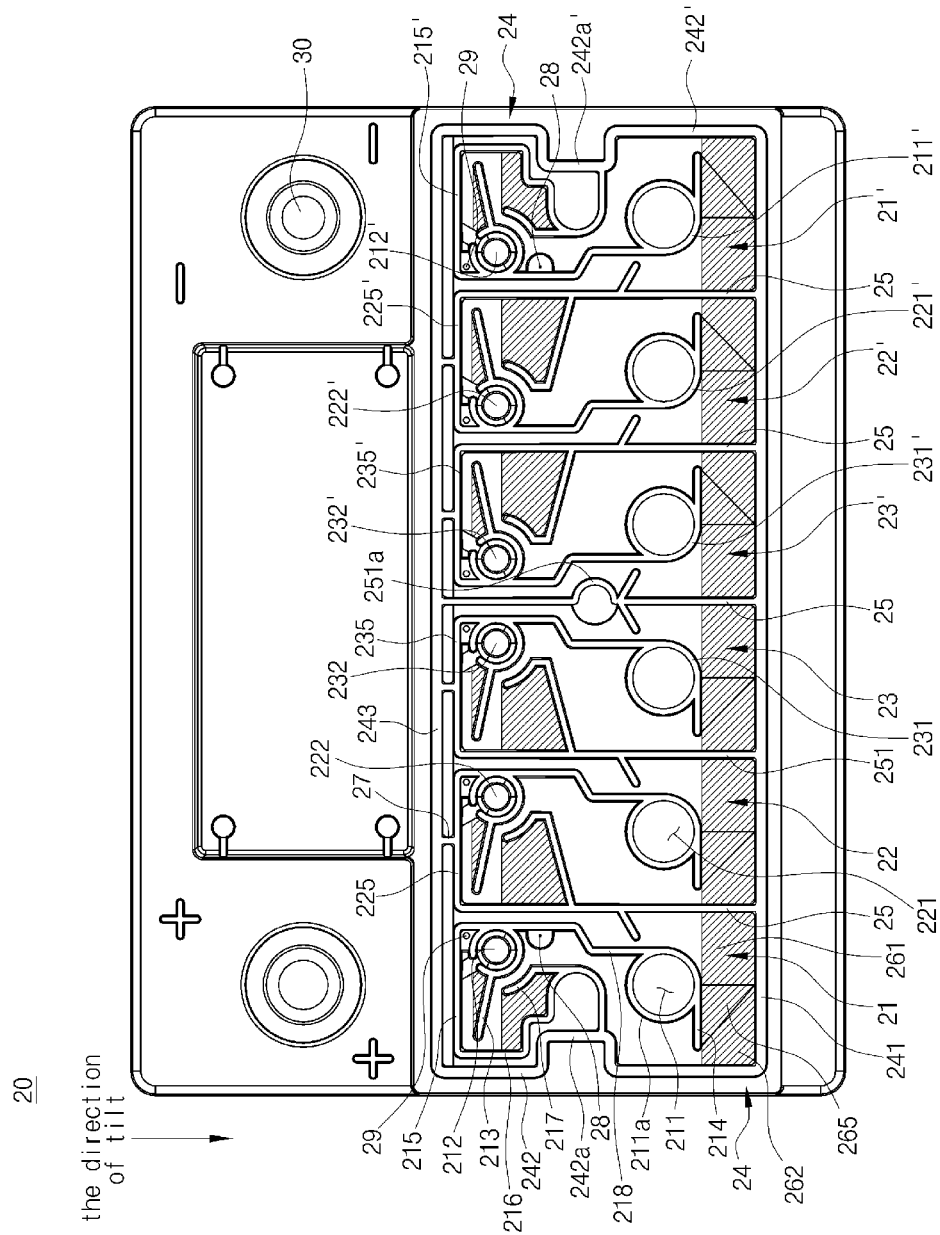

FIGS. 10 and 11 illustrate a state of the battery in which the upper and lower parts of the battery are placed at locations opposite to those in FIGS. 8 and 9, in which FIG. 10 is a perspective view illustrating a state in which the battery is turned over so that the upper cover 10 faces the front, and FIG. 11 is a plane view illustrating the lower cover 20 in a state in which the battery is turned over in the same manner as that of FIG. 10.

The operation of the battery cover in the overturned state of the battery will be described with reference to FIGS. 10 and 11. When the battery is turned over as shown in FIG. 10, the recovery ports 212, 222, 232, 212', 222', 232' are placed in upper parts of the respective lower cells 21, 22, 23, 21', 22', 23' and the lower injection ports 211, 221, 231, 211', 221', 231' are placed in lower parts. In the above state, because the recovery ports 212, 222, 232, 212', 222', 232' are placed in the upper parts, a small amount of electrolyte may leak from the battery case during a process in which the battery stands vertically from a tilting state. However, when the battery stands completely vertically, the recovery ports 212, 222, 232, 212', 222', 232' are completely placed in the upper parts, so that the battery cover of the present invention can stop the leakage of the electrolyte.

Particularly, in an embodiment of the present invention, the lower injection ports 211, 221, 231, 211', 221', 231' and the upper injection ports 113, 123, 133, 113', 123', 133' are hermetically welded to each other, so that the lower injection ports 211, 221, 231, 211', 221', 231' are completely sealed and, accordingly, do not allow a leakage of the electrolyte.

Further, when the battery recovers to its original upright position, the leaking electrolyte can be recovered by the recovery ports 212, 222, 232, 212', 222', 232' so that the present invention can efficiently prevent the electrolyte from leaking to the outside.

Figure 12:
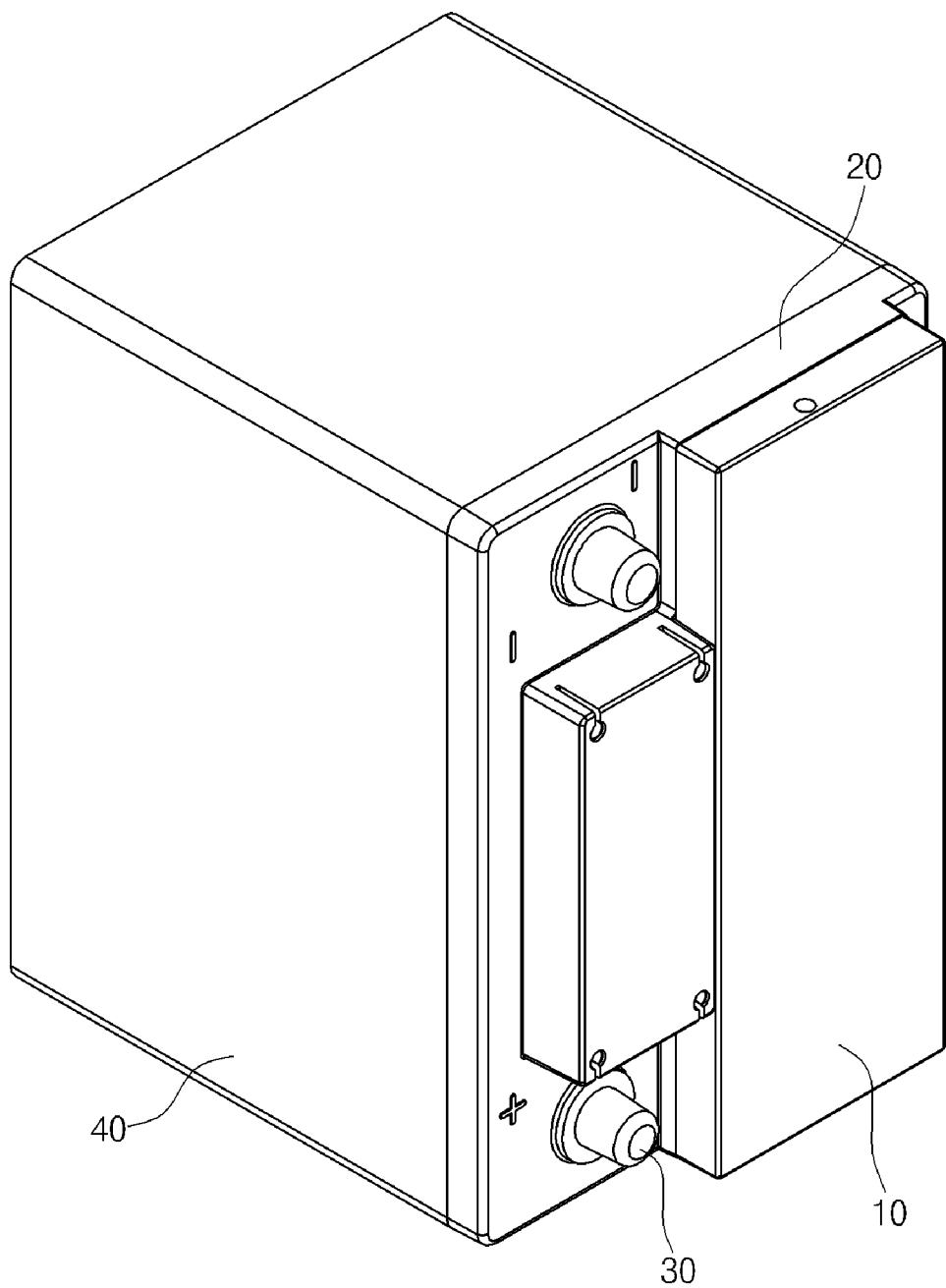
Figure 13:
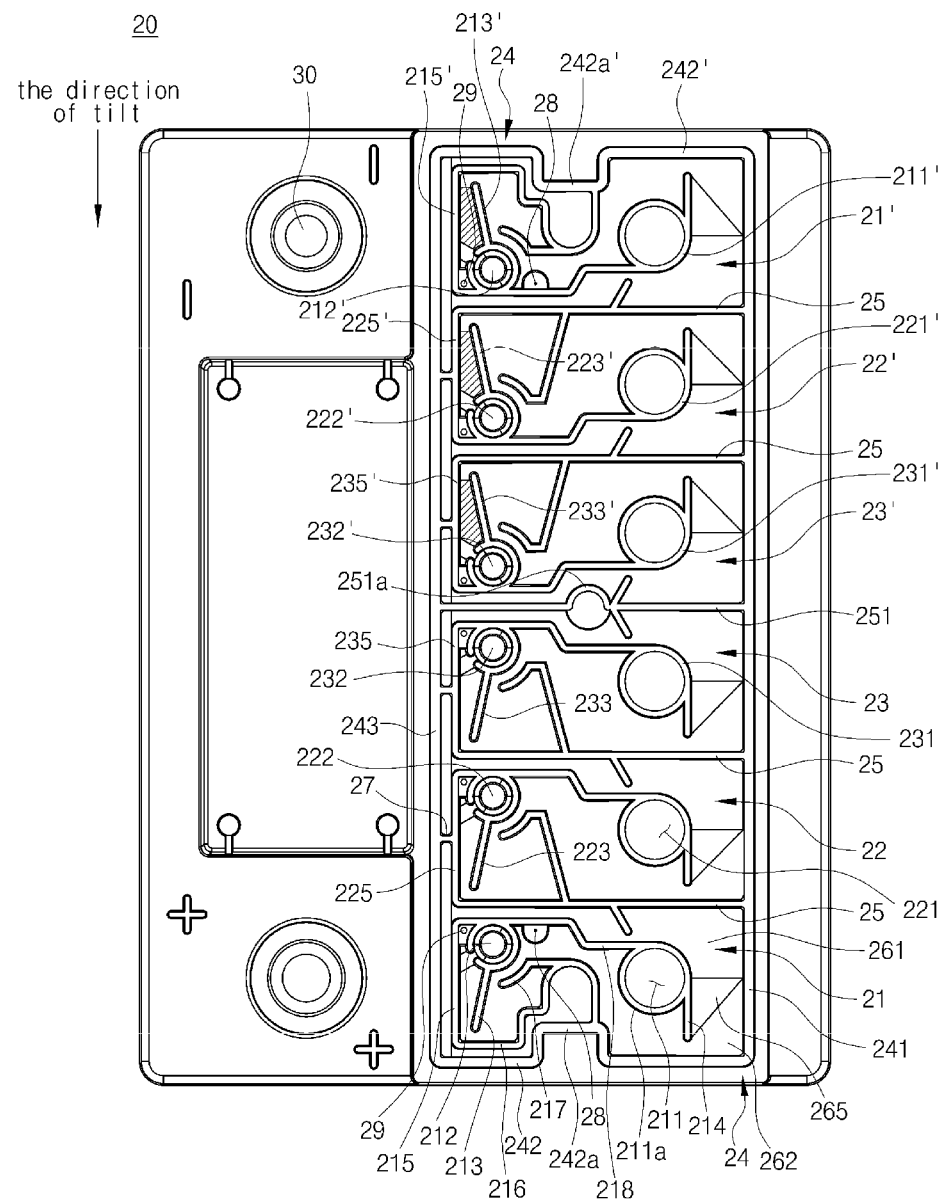

FIG. 12 is a perspective view illustrating a tilting state of the battery in which the battery of FIG. 10 is made to stand vertically after being rotated to the left. FIG. 13 is a plane view illustrating the lower cover 20 in the tilting state of the battery as shown in FIG. 12.

As shown in FIGS. 12 and 13, in the respective lower cells 21, 22, 23, 21', 22', 23' of the lower cover 20 of the present invention, the lower recovery ports 212, 222, 232, 212', 222', 232' are placed at predetermined location and are leaning toward the lower cell center wall 251. Accordingly, when the battery tilts as shown in FIGS. 12 and 13, the first lower cell 21 is placed in the lowermost location, while the sixth lower cell 21' is placed at the uppermost location. In the above-mentioned tilting state of the battery, the recovery ports 212, 222, 232 that are formed in the first to third lower cells 21, 22, 23 at predetermined location and are leaning toward the lower cell center wall 251 are placed in upper parts within areas of the respective lower cells 21, 22, 23.

On the contrary, the recovery ports 212', 222', 232' of the fourth to sixth lower cells 21', 22', 23' are formed in the respective cell areas at predetermined location and are leaning toward the lower cell center wall 251, so that the recovery ports 212', 222', 232' in the above-mentioned tilting state of the battery are placed in lower parts within the cell areas of the respective lower cells 21', 22', 23'.

Accordingly, because the recovery ports 212', 222', 232' of the fourth to sixth lower cells 21', 22', 23' are placed in the lower parts within the respective cell areas, the heights of the recovery ports 212', 222', 232' are lower than the surface levels of the electrolyte that is stored in the partitioned chambers of the battery case 40, so that the electrolyte leaks from the battery case through the recovery ports 212', 222', 232'. However, in the above case, a discharge pressure is efficiently expelled both through the gas discharge holes 29 and through the micro-holes 28, so that the electrolyte that leaks from the battery case through the recovery ports 212', 222', 232' of the fourth to sixth lower cells 21', 22', 23' cannot pass over the first lower extension walls 213', 223', 233'.

On the contrary, the recovery ports 212, 222, 232 of the first to third lower cells 21, 22, 23 are placed in upper parts within the respective cell areas. In the above state, the surface levels of the electrolyte that is stored in the partitioned chambers (not shown) of the battery case 40 communicating with the first to third lower cells 21, 22, 23 are lower than the heights of the recovery ports 212, 222, 232, so that no electrolyte leaks from the battery case 40 through the recovery ports 212, 222, 232.

The interior of the battery case 40 is divided into chambers that correspond to the one or more lower cells 21, 22, 23, 21', 22', 23', respectively. The partitioned chambers (not shown) of the battery case 40 are configured as independent spaces that are formed by partition walls (not shown). Here, it is typical to control the amount of the electrolyte that is injected into the portioned chambers of the battery case such that predetermined spaces can be left within the respective partitioned chambers, so that, when the recovery ports 212, 222, 232 are placed at the upper parts within the respective cell areas, the recovery ports 212, 222, 232 are placed at heights above the level surfaces of the electrolyte that is stored in the partitioned chambers of the battery case 40.

In other words, the recovery ports 212, 222, 232 of the first to third lower cells 21, 22, 23 of the battery in the above state are placed at heights higher than the surface levels of the electrolyte that is stored in the partitioned chambers of the battery case, so that no electrolyte leaks from the battery case through the recovery ports 212, 222, 232. Further, although the recovery ports 212', 222', 232' of the fourth to sixth lower cells 21', 22', 23' in the above state are placed in the lower parts, gas is discharged from the battery case both through the gas discharge holes 29 and through the micro-holes 28, so that a pressure that intends to discharge the electrolyte from the battery case is not generated. Accordingly, the amount of electrolyte that leaks from the battery case through the fourth to sixth lower cells 21', 22', 23' is too small, and so the leaking electrolyte cannot pass over the first lower extension walls 213', 223', 233'.

Further, as described above, even when the battery is turned over, the present invention can prevent a leakage of the electrolyte by the upper dampers 114.

When the battery is turned over from a normal state by an external shock or vibrations, the electrolyte leaks from the battery case through the lower recovery ports 212, 222, 232, 212', 222', 232' of the lower cover 20. In the overturned state of the battery, the lower recovery ports 212, 222, 232, 212', 222', 232' of the lower cover 20 are placed to face downward, so that the electrolyte leaks from the battery case through the cutout holes 212d of the lower recovery ports 212, 222, 232, 212', 222', 232' and drops onto areas that are defined by the first upper extension walls 112, the second upper extension walls 117 and the upper injection ports 113, 123, 133, 113', 123', 133' of the upper cover 10. However, in an embodiment of the present invention, the upper dampers 114 prevent the electrolyte that has dropped onto the upper cover 10 from moving further. The above-mentioned operational function of the battery cover in the overturned state is shown in FIG. 14.

Figure 14:
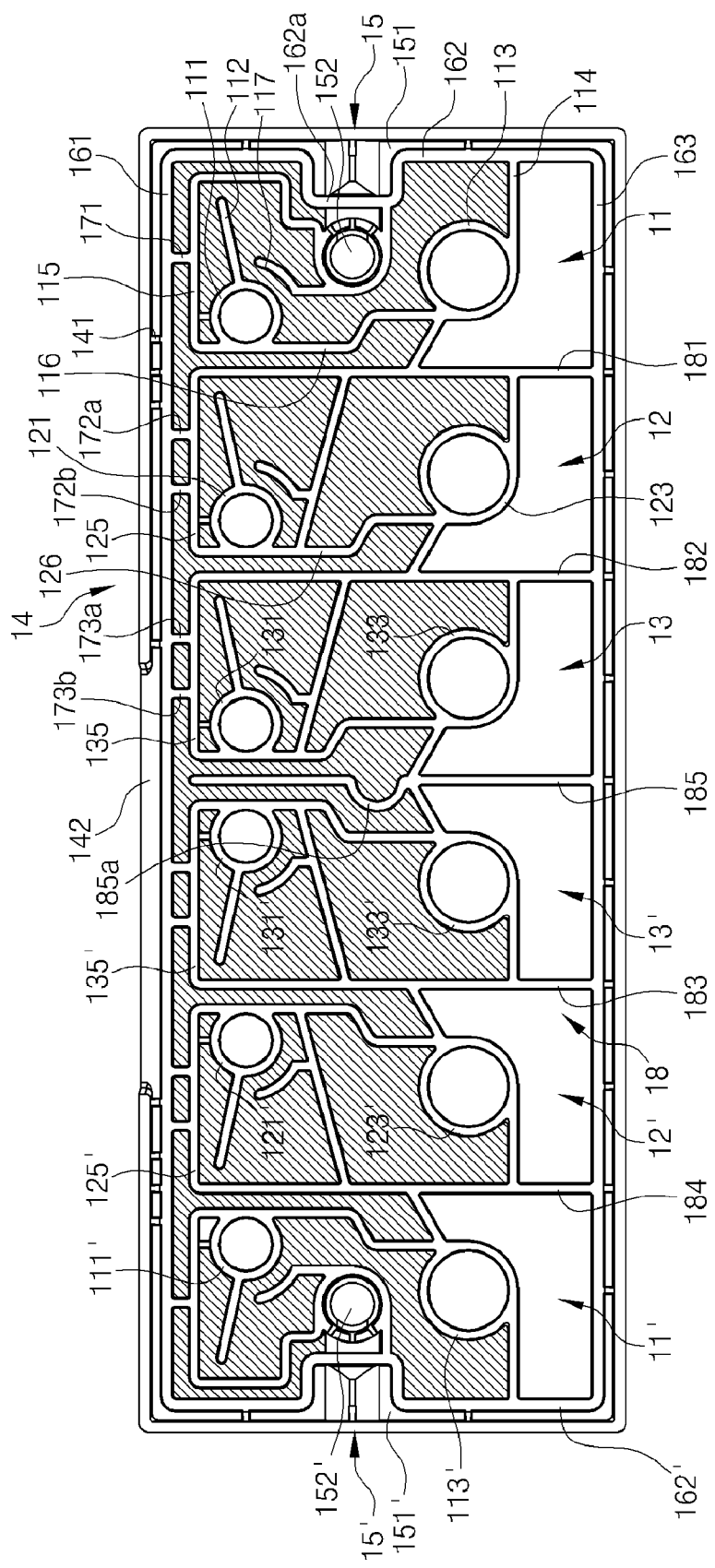
FIG. 14 is a plane view illustrating an overturned state of the upper cover of the battery cover for prevention of electrolyte leakage according to an embodiment of the present invention.

FIG. 14 is a plane view illustrating an overturned state of the upper cover of the battery cover for prevention of electrolyte leakage according to an embodiment of the present invention.

As shown in FIG. 14, when the battery is turned over in a state in which the upper cover 10 and the lower cover 20 are mounted to each other, the electrolyte leaks from the battery case through the lower recovery ports 212, 222, 232, 212', 222', 232' of the lower cover 20 and is collected on the overturned lower surface of the upper cover 10. In the above state, the electrolyte that has dropped from the lower recovery ports 212, 222, 232, 212', 222', 232' is collected in the areas that extend from the first upper extension walls 112 to both the upper injection ports 113, 123, 133, 113', 123', 133' and the upper dampers 114, and so further movement of the electrolyte from the areas is restricted by the upper dampers 114.

In the related art, in order to prevent a leakage of electrolyte from the battery case, plugs are installed in the lower injection ports, respectively. However, related art techniques using the plugs are problematic in that when the battery is turned over, the electrolyte may leak from the battery case through gaps around the plugs. Unlike the related art techniques, in an embodiment of the present invention, the upper injection ports of the upper cover and the lower injection ports of the lower cover are integrated with each other through welding, thereby fundamentally preventing a leakage of the electrolyte through the injection ports.

Accordingly, in the battery according to an embodiment of the present invention, the upper dampers 114 of the upper cover 10 can efficiently restrict a movement of the leaking electrolyte even when the battery is turned over, so that the present invention can minimize the leakage amount of the electrolyte.

As described above, the present invention is advantageous in that the micro-holes 28, the gas discharge holes 29 and the lower recovery ports 212 are formed within respective cell areas at predetermined location and are leaning in directions from the opposite outermost ends of the battery cover to the center of the battery cover, so that the present invention can minimize the leakage of the electrolyte even when the battery tilts to one side or is turned over, and can easily and efficiently recover a leaking electrolyte.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A battery cover for prevention of electrolyte leakage, comprising:
    a lower cover to be hermetically seated on an upper end of a battery case that stores an electrolyte therein, the lower cover comprising:
        one or more lower cells arranged lengthwise on an upper surface of the lower cover;
        a lower wall extending horizontally and vertically at spaced locations; and
        a lower labyrinth wall extending vertically in a space between the lower cells and the lower wall;
        lower recovery ports each having one or more recovery holes so as to recover a leaked electrolyte into the battery case, wherein the lower recovery ports are formed in the respective lower cells;
        gas discharge holes formed in each of the one or more lower cells communicating with the battery case that stores the electrolyte therein, thereby discharging gas from the battery case; and
        micro-holes communicating with an interior of the battery case to discharge gas from the battery case, the micro-holes spaced apart from the lower recovery ports and are formed in only the opposite outermost cells of the one or more lower cells:
    and
    an upper cover mounted to an upper end of the lower cover, the upper cover comprising:
        one or more upper cells arranged lengthwise on a lower surface of the upper cover;
        an upper inner wall extending horizontally and vertically at spaced locations;
        an upper labyrinth wall extending vertically in a space between the upper cells and the upper inner wall and connecting the upper cells to the upper inner wall, the upper labyrinth wall comprising a pair of upper labyrinth walls that are spaced apart from each other, the lower labyrinth wall placed between the pair of upper labyrinth walls;
        upper recovery ports that form walls protruding from lower surfaces of the upper cells, the upper recovery ports sealing upper ends of lower recovery ports; and upper dampers horizontally extending within areas of the upper cells, the upper dampers functioning as dams for preventing a movement of the electrolyte.

2. The battery cover as set forth in claim 1, wherein the upper cover further comprises:
- an outer wall protruding along an edge of the lower surface of the upper cover and extending horizontally and vertically so that the outer wall forms a rim along the edge of the lower surface of the upper cover;
- gas discharge ports formed through the outer wall from opposite outermost upper cells of the one or more upper cells so as to discharge gas that is discharged from the battery case;
- a guide wall extending inclinedly in a vertical direction at a location between the outer wall and the upper inner wall; and
- one or more upper cell partition walls extending vertically from the upper inner wall so as to partition the one or more upper cells from each other.

3. The battery cover as set forth in claim 2, wherein the upper inner wall comprises:
- a first upper inner wall extending along upper ends of the one or more upper cells;
- second upper inner walls extending vertically from opposite ends of the first upper inner wall and having respective bent parts that are bent inwardly in opposite ends of the upper cover having the gas discharge ports; and
- a third upper inner wall extending horizontally between ends of the second upper inner walls at a location opposed to the first upper inner wall, thereby forming lower horizontal walls of the one or more upper cells.

4. The battery cover as set forth in claim 1, wherein each of the lower recovery ports includes:
- the one or more recovery holes being open at upper ends thereof and formed through a bottom surface of an associated lower cell so as to communicate with the battery case;
- a recovery port outside wall protruding upward from the bottom surface through which the recovery holes are formed; and
- one or more cutout holes formed by cutting the recovery port outside wall and allowing the leaked electrolyte to flow therethrough.

5. The battery cover as set forth in claim 1, wherein the lower cells, on which the upper cells are placed, further include:
- lower injection ports formed through bottom surfaces of the lower cells so as to inject the electrolyte into the battery case;
- lower horizontal walls extending horizontally in a way such that the lower horizontal walls are spaced apart from the lower wall;
- lower cell partition walls extending vertically so as to partition neighboring lower cells from each other; and
- lower guide walls extending from outside walls of the lower injection ports to the lower horizontal walls after passing the lower recovery ports in such a way that the lower guide walls are spaced apart from the lower cell partition walls, so that the lower guide walls form electrolyte passages for guiding leaked electrolyte from the lower recovery ports or from the lower injection ports to the lower labyrinth wall.

6. The battery cover as set forth in claim 5, wherein the lower cells include:
- first lower extension walls extending from outside walls of the lower recovery ports in directions toward opposite outermost lower cells;
- second lower extension walls extending from the lower cell partition walls so as to form walls spaced apart from the lower recovery ports, thereby defining electrolyte passages for guiding leaked electrolyte; and
- third lower extension walls extending horizontally from outside walls of the lower injection ports at locations opposite to the lower guide walls, thereby forming electrolyte passages between distal ends thereof and lower cells close to the distal ends.

7. The battery cover as set forth in claim 5, wherein each of the lower cells is configured such that a height of a first bottom surface forming an electrolyte passage between the lower guide wall and the lower cell partition wall is higher than a height of a second bottom surface in which both the lower recovery port and the lower injection port are formed.

8. The battery cover as set forth in claim 7, wherein each of the lower cells further includes:
- an inclined surface sloping down from the first bottom surface to the second bottom surface.

9. The battery cover as set forth in claim 5, wherein the upper cells include:
- upper injection ports welded to the lower injection ports of the lower cells, thereby sealing the lower injection ports.

10. The battery cover as set forth in claim 1, wherein the upper cells further include:
- upper horizontal walls extending horizontally so as to allow the upper labyrinth wall to be connected vertically;
- first upper extension walls extending inclinedly from the upper recovery ports;
- upper guide walls extending vertically from first ends of the upper horizontal walls; and
- upper guider walls extending vertically from second ends of the upper horizontal walls and forming passages between the upper guider walls and the upper inner wall that extends in a direction equal to directions of the upper guider walls, thereby guiding electrolyte and gas.

* * * * *